US008511512B2

(12) United States Patent
Carlson et al.

(10) Patent No.: US 8,511,512 B2
(45) Date of Patent: Aug. 20, 2013

(54) IMPACT LOAD PROTECTION FOR MASS-BASED PRODUCT DISPENSERS

(75) Inventors: Brian P. Carlson, Saint Paul, MN (US); Scott R. Limback, St. Paul, MN (US); Joshua J. Lanz, West St. Paul, MN (US)

(73) Assignee: Ecolab USA Inc., St. Paul, MN (US)

( * ) Notice: Subject to any disclaimer, the term of this patent is extended or adjusted under 35 U.S.C. 154(b) by 750 days.

(21) Appl. No.: 12/683,666

(22) Filed: Jan. 7, 2010

(65) Prior Publication Data

US 2011/0165034 A1 Jul. 7, 2011

(51) Int. Cl.
*G01G 13/00* (2006.01)

(52) U.S. Cl.
USPC ................. 222/58; 222/55; 222/77; 422/501; 422/509; 422/504; 422/105; 422/107

(58) Field of Classification Search
USPC ................. 422/500–501, 504, 509, 517, 521, 422/63–68.1, 105, 107, 560–561; 222/55, 222/58, 77
See application file for complete search history.

(56) References Cited

U.S. PATENT DOCUMENTS

| | | | | |
|---|---|---|---|---|
| 33,861 | A | | 12/1861 | Whitney |
| 1,985,615 | A | | 12/1934 | Mitchell |
| 2,219,597 | A | | 10/1940 | Lutz |
| 2,319,739 | A | | 5/1943 | Kessler |
| 2,333,791 | A | | 11/1943 | Hutchinson |
| 3,091,327 | A | | 5/1963 | Lalley |
| 3,136,157 | A | | 6/1964 | Seed et al. |
| 3,412,254 | A | | 11/1968 | Meyer-Doering et al. |
| 3,526,334 | A | | 9/1970 | Ashton et al. |
| 3,578,094 | A | * | 5/1971 | Henry et al. .................. 177/108 |
| 3,653,544 | A | * | 4/1972 | Young et al. .................... 222/55 |
| 3,743,598 | A | | 7/1973 | Field |
| 3,754,871 | A | | 8/1973 | Hessel et al. |
| 3,760,166 | A | | 9/1973 | Adams et al. |
| 3,772,193 | A | | 11/1973 | Nelli et al. |
| 3,774,056 | A | | 11/1973 | Sample et al. |

(Continued)

FOREIGN PATENT DOCUMENTS

| | | |
|---|---|---|
| DE | 100 39 408 A1 | 12/2001 |
| GB | 2052251 | 1/1981 |

(Continued)

OTHER PUBLICATIONS

Office Action from U.S. Appl. No. 12/567,266, dated Jun. 20, 2011, 13 pp.

(Continued)

*Primary Examiner* — Brian R Gordon
(74) *Attorney, Agent, or Firm* — Shumaker & Sieffert, P.A.

(57) ABSTRACT

A chemical product dispenser that controls dispensation of a chemical product based on a change in weight of the chemical product remaining in the dispenser includes an isolation mechanism. The dispenser includes a weight measurement instrument, such as one or more load cells, that measure the weight of the chemical product remaining the dispenser. The isolation mechanism is configured to lift the chemical product from a lowered position in which the weight of the chemical product is fully supported by the load cell(s) to a raised position in which the weight of the chemical product is fully supported by the isolation mechanism. When in the raised position, the dispenser may be loaded with a supply of chemical product with a reduced risk of damage to the weight measurement instrument.

21 Claims, 14 Drawing Sheets

(56) References Cited

U.S. PATENT DOCUMENTS 3,796,349 A * 3/1974 Weber ............................ 222/55
3,826,113 A 7/1974 Boraas et al.
3,826,408 A 7/1974 Berndt et al.
4,040,515 A 8/1977 Hessel et al.
4,046,996 A 9/1977 Williams et al.
4,199,001 A 4/1980 Kratz
4,211,517 A 7/1980 Schmid
4,241,400 A 12/1980 Kiefer
4,247,396 A 1/1981 Buseing
4,265,266 A 5/1981 Kierbow et al.
4,353,482 A 10/1982 Tomlinson et al.
4,373,418 A 2/1983 Rhodes et al.
4,396,828 A 8/1983 Dino et al.
4,402,426 A 9/1983 Faulkner et al.
4,404,639 A 9/1983 McGuire et al.
4,463,844 A 8/1984 Huffman et al.
4,482,785 A 11/1984 Finnegan et al.
4,509,543 A 4/1985 Livingston et al.
4,573,606 A 3/1986 Lewis et al.
4,597,091 A 6/1986 Blake
4,630,654 A 12/1986 Kennedy, Jr.
4,676,399 A 6/1987 Burckhardt
4,690,305 A 9/1987 Copeland
4,697,243 A 9/1987 Moore et al.
4,707,848 A 11/1987 Durston et al.
4,711,370 A 12/1987 Goudy, Jr. et al.
4,733,971 A 3/1988 Pratt
4,756,321 A 7/1988 Livingston et al.
4,766,548 A 8/1988 Cedrone et al.
4,770,859 A 9/1988 Heiser, Jr.
4,826,661 A 5/1989 Copeland et al.
4,834,546 A 5/1989 Pütz
4,837,811 A 6/1989 Butler et al.
4,843,579 A 6/1989 Andrews et al.
4,845,965 A 7/1989 Copeland et al.
4,848,381 A 7/1989 Livingston et al.
4,858,449 A 8/1989 Lehn
4,867,196 A 9/1989 Zetena et al.
4,867,343 A 9/1989 Ricciardi et al.
4,908,190 A 3/1990 Maglio et al.
4,938,240 A 7/1990 Lakhan et al.
4,944,428 A * 7/1990 Gmur et al. .................... 222/55
4,964,185 A 10/1990 Lehn
4,969,011 A 11/1990 Faull et al.
4,974,646 A * 12/1990 Martin et al. .................. 141/67
4,976,137 A 12/1990 Decker et al.
4,980,292 A 12/1990 Elbert et al.
4,999,124 A 3/1991 Copeland
5,006,995 A * 4/1991 Toschi et al. ................. 700/240
5,014,211 A 5/1991 Turner et al.
5,014,877 A 5/1991 Roos
5,024,352 A 6/1991 Gmür et al.
5,036,479 A 7/1991 Prednis et al.
5,038,807 A 8/1991 Bailey et al.
5,038,973 A * 8/1991 Gmur ............................ 222/56
5,040,699 A 8/1991 Gangemi
5,043,860 A 8/1991 Koether et al.
5,053,206 A 10/1991 Maglio et al.
5,064,094 A 11/1991 Roos et al.
5,115,842 A 5/1992 Crafts et al.
5,136,281 A 8/1992 Bonaquist
5,147,615 A 9/1992 Bird et al.
5,158,895 A * 10/1992 Ashihara et al. ............. 436/526
5,203,366 A 4/1993 Czeck et al.
5,219,224 A 6/1993 Pratt
5,222,027 A 6/1993 Williams et al.
5,240,326 A 8/1993 Evanson
5,268,153 A 12/1993 Muller
5,279,448 A 1/1994 Hanlin et al.
5,283,639 A 2/1994 Esch et al.
5,294,022 A 3/1994 Earle
5,316,195 A 5/1994 Moksnes et al.
5,322,571 A 6/1994 Plummer et al.
5,332,312 A 7/1994 Evanson
5,345,379 A 9/1994 Brous et al.
5,369,032 A 11/1994 Pratt
5,370,267 A 12/1994 Schroeder
5,389,344 A 2/1995 Copeland et al.
5,397,028 A 3/1995 Jesadanont
5,400,018 A 3/1995 Scholl et al.
5,404,893 A 4/1995 Brady et al.
5,407,598 A 4/1995 Olson et al.
5,411,716 A 5/1995 Thomas et al.
5,427,748 A 6/1995 Wiedrich et al.
5,497,914 A 3/1996 Maltsis
5,500,050 A 3/1996 Chan et al.
5,505,915 A 4/1996 Copeland et al.
5,556,478 A 9/1996 Brady et al.
5,580,448 A 12/1996 Brandreth
5,581,982 A * 12/1996 Schroeder et al. ............. 53/459
5,584,025 A 12/1996 Keithley et al.
5,584,079 A 12/1996 Wong et al.
5,609,417 A 3/1997 Otte
5,619,183 A 4/1997 Ziegra et al.
5,625,659 A 4/1997 Sears
5,625,908 A 5/1997 Shaw
5,632,411 A * 5/1997 Harty et al. ....................... 222/1
5,636,008 A 6/1997 Lobiondo et al.
5,638,417 A 6/1997 Boyer et al.
5,653,269 A 8/1997 Miller et al.
5,671,262 A 9/1997 Boyer et al.
5,679,173 A 10/1997 Hartman
5,681,400 A 10/1997 Brady et al.
5,694,323 A 12/1997 Koropitzer et al.
5,695,091 A 12/1997 Winings et al.
5,724,261 A 3/1998 Denny et al.
5,745,381 A 4/1998 Tanaka et al.
5,757,664 A 5/1998 Rogers et al.
5,758,300 A 5/1998 Abe
5,759,501 A 6/1998 Livingston et al.
5,761,278 A 6/1998 Pickett et al.
5,762,096 A 6/1998 Mirabile
5,769,536 A 6/1998 Kotylak
5,777,895 A 7/1998 Kuroda et al.
5,821,523 A 10/1998 Bunte et al.
5,826,749 A 10/1998 Howland et al.
5,827,486 A 10/1998 Crossdale
5,839,097 A 11/1998 Klausner
5,851,291 A 12/1998 Poterala et al.
5,861,881 A 1/1999 Freeman et al.
5,864,783 A 1/1999 Struck et al.
5,875,430 A 2/1999 Koether
5,885,446 A 3/1999 McGrew, Jr.
5,887,975 A 3/1999 Mordaunt et al.
5,897,671 A 4/1999 Newman et al.
5,902,749 A 5/1999 Lichtwardt et al.
5,931,877 A 8/1999 Smith et al.
5,933,479 A 8/1999 Michael et al.
5,938,074 A * 8/1999 Dartus ............................. 222/1
5,939,974 A 8/1999 Heagle et al.
5,945,910 A 8/1999 Gorra
5,956,487 A 9/1999 Venkatraman et al.
5,961,561 A 10/1999 Wakefield, II
5,967,202 A 10/1999 Mullen et al.
5,973,696 A 10/1999 Agranat et al.
5,974,345 A 10/1999 Buck et al.
5,975,352 A 11/1999 Spriggs et al.
5,980,090 A 11/1999 Royal et al.
5,992,686 A 11/1999 Cline et al.
6,003,070 A 12/1999 Frantz
6,007,788 A 12/1999 Bellon et al.
6,029,286 A 2/2000 Funk
6,049,792 A 4/2000 Hart et al.
6,061,668 A 5/2000 Sharrow
6,073,124 A 6/2000 Krishnan et al.
6,082,149 A 7/2000 Woods
6,098,843 A 8/2000 Soberanis et al.
6,120,175 A 9/2000 Tewell
6,129,449 A 10/2000 McCain et al.
6,133,555 A 10/2000 Brenn
6,136,184 A 10/2000 King
6,164,189 A 12/2000 Anson
6,167,358 A 12/2000 Othmer et al.
6,220,312 B1 4/2001 Hirsch et al.

| | | | | |
|---|---|---|---|---|
| 6,249,778 | B1 | 6/2001 | Vaghi | |
| 6,269,975 | B2 | 8/2001 | Soberanis et al. | |
| 6,321,204 | B1 | 11/2001 | Kazami et al. | |
| 6,330,499 | B1 | 12/2001 | Chou et al. | |
| 6,356,205 | B1 | 3/2002 | Salvo et al. | |
| 6,357,292 | B1 | 3/2002 | Schultz et al. | |
| 6,370,454 | B1 | 4/2002 | Moore | |
| 6,377,868 | B1 | 4/2002 | Gardner, Jr. | |
| 6,418,371 | B1 | 7/2002 | Arnold | |
| 6,438,471 | B1 | 8/2002 | Katagishi et al. | |
| 6,463,940 | B1 | 10/2002 | Thomas et al. | |
| 6,472,615 | B1 | 10/2002 | Carlson | |
| 6,490,513 | B1 | 12/2002 | Fish et al. | |
| 6,547,097 | B1 | 4/2003 | Cavallaro et al. | |
| 6,561,381 | B1 | 5/2003 | Osterheld et al. | |
| 6,697,706 | B2 | 2/2004 | Gardner, Jr. | |
| 6,707,873 | B2 | 3/2004 | Thompson et al. | |
| 6,896,140 | B1 | 5/2005 | Perry | |
| 6,921,000 | B2 | 7/2005 | Wagner et al. | |
| 6,987,228 | B1 | 1/2006 | MacMichael et al. | |
| 7,128,215 | B2 | 10/2006 | Danechi | |
| 7,175,048 | B2 * | 2/2007 | Wolfschaffner | 222/77 |
| 7,201,290 | B2 | 4/2007 | Mehus et al. | |
| 7,228,990 | B2 * | 6/2007 | Schmidt | 222/77 |
| 7,410,623 | B2 | 8/2008 | Mehus et al. | |
| 7,530,729 | B2 * | 5/2009 | O'Callaghan | 366/132 |
| 7,891,523 | B2 | 2/2011 | Mehus et al. | |
| 2001/0023841 | A1 | 9/2001 | Zimmerman et al. | |
| 2001/0038018 | A1 | 11/2001 | Bell et al. | |
| 2001/0039501 | A1 | 11/2001 | Crevel et al. | |
| 2001/0047214 | A1 | 11/2001 | Cocking et al. | |
| 2001/0053939 | A1 | 12/2001 | Crevel et al. | |
| 2001/0054038 | A1 | 12/2001 | Crevel et al. | |
| 2002/0014496 | A1 * | 2/2002 | Cline et al. | 222/1 |
| 2003/0033156 | A1 | 2/2003 | McCall | |
| 2003/0033396 | A1 | 2/2003 | McCall | |
| 2003/0043688 | A1 | 3/2003 | Peterson et al. | |
| 2003/0121561 | A1 | 7/2003 | Wagner et al. | |
| 2003/0155035 | A1 * | 8/2003 | Ichikawa et al. | 141/301 |
| 2003/0195656 | A1 | 10/2003 | Gardner, Jr. et al. | |
| 2004/0015269 | A1 | 1/2004 | Jungmann et al. | |
| 2004/0088076 | A1 | 5/2004 | Gardner, Jr. et al. | |
| 2004/0162850 | A1 | 8/2004 | Sanville et al. | |
| 2004/0220844 | A1 | 11/2004 | Sanville et al. | |
| 2004/0226956 | A1 | 11/2004 | Brooks | |
| 2004/0226959 | A1 | 11/2004 | Mehus et al. | |
| 2004/0230339 | A1 | 11/2004 | Maser et al. | |
| 2004/0232163 | A1 | 11/2004 | Reinsch et al. | |
| 2005/0065644 | A1 | 3/2005 | Gardner, Jr. et al. | |
| 2005/0072793 | A1 | 4/2005 | Mehus et al. | |
| 2005/0102059 | A1 | 5/2005 | Gardner et al. | |
| 2008/0271928 | A1 | 11/2008 | Mehus et al. | |
| 2008/0283145 | A1 * | 11/2008 | Maxwell | 141/114 |
| 2009/0037026 | A1 | 2/2009 | Sostaric et al. | |
| 2009/0090564 | A1 | 4/2009 | Kresina | |
| 2009/0171502 | A1 | 7/2009 | Freidin | |
| 2009/0294469 | A1 | 12/2009 | Poulain et al. | |

FOREIGN PATENT DOCUMENTS

| | | | |
|---|---|---|---|
| JP | 06226068 | | 8/1994 |
| JP | 09066995 | | 3/1997 |
| JP | 09066999 | | 3/1997 |
| JP | 11156101 | | 6/1999 |
| WO | 98/26704 | A1 | 6/1998 |
| WO | 03/059143 | A1 | 7/2003 |
| WO | 2006133026 | A2 | 12/2006 |

OTHER PUBLICATIONS

Response to Office Action dated Jun. 20, 2011, from U.S. Appl. No. 12/567,266, filed Sep. 20, 2011, 10 pp.

Office Action from U.S. Appl. No. 11/799,692, dated Jul. 22, 2011, 15 pp.

Response to Office Action dated Jul. 22, 2011, from U.S. Appl. No. 11/799,692, filed Oct. 24, 2011, 6 pp.

Response to Office Action dated Feb. 2, 2012, from U.S. Appl. No. 12/567,266, filed May 2, 2012, 5 pp.

Notice of Allowance from U.S. Appl. No. 12/711,892, dated Feb. 2, 2011, 9 pp.

Office Action from U.S. Appl. No. 11/799,692, dated Feb. 3, 2011, 13 pp.

Response to Office Action dated Feb. 3, 2011, from U.S. Appl. No. 11/799,692, filed May 3, 2011, 8 pp.

Nova Controls, Nova News, "Save Money and Gain Sales Features?" Aug. 12, 1992, 1 pg.

Nova Controls, "ORION Liquid Landry Supply Dispenser," Feb. 1989, 5 pp.

Sample Reports, Nova Controls, Oct. 1997, 8 pp.

Sample Reports, Novalink™ System, Jan. 1996, 9 pp.

Nexgen SI, Inc., "*InTouch* Water Treatment Information Management Solution," Mar. 29, 1999, 59 pp.

Novalink™ brochure: "Laundry Information System: Overview Reports," Dec. 13, 1995, 6 pp.

Diversey, Diverlog-L Enhanced "DLE—Production Summary Reports," Apr. 1990, 5 pp.

Diversey, Diverlog-L Enhanced "DLE Set-up Report," Apr. 1990, 7 pp.

Diversey, Diverlog-L Enhanced "DLE—Single Cycle Reports," Mar. 1990, 5 pp.

Clax Diverflow System, "Advanced Central Dosing Technology for Laundries," copyright DiverseyLever 1998, 3 pp.

Ecolab® Inc., product brochure: "We'd like to make a couple of things perfectly Clear," copyright 1998, 4 pp.

Ecolab® BALANCER. COM, MRE, Jun. 4, 1997, 4 pp.

Ecolab® Inc., product brochure: "relax. We've Got Your Pool Concerns Under Control," copyright 1998, 4 pp.

Office Action from U.S. Appl. No. 10/843,219, dated Feb. 9, 2007, 26 pp.

Response to Office Action dated Feb. 9, 2007, for U.S. Appl. No. 10/843,219, filed May 9, 2007, 17 pp.

Office Action from U.S. Appl. No. 10/843,219, dated Jul. 24, 2007, 18 pp.

Response to Office Action dated Jul. 24, 2007, for U.S. Appl. No. 10/843,219, filed Oct. 23, 2007, 10 pp.

Office Action from U.S. Appl. No. 10/843,219, dated Jan. 10, 2008, 16 pp.

Response to Office Action dated Jan. 10, 2008, for U.S. Appl. No. 10/843,219, filed Mar. 28, 2008, 12 pp.

Notice of Allowance for U.S. Appl. No. 10/843,219, mailed May 1, 2008, 12 pp.

Office Action from U.S. Appl. No. 12/567,266, dated Feb. 2, 2012, 14 pp.

Response to Office Action dated Dec. 9, 2011, from U.S. Appl. No. 11/799,692, Mar. 9, 2012, 6 pp.

Office Action from U.S. Appl. No. 12/567,266, dated Aug. 29, 2012, 17 pp.

Novalink™ OverView™ Program Pricing, in U.S. Appl. No. 10/436,454 on May 20, 2005, 1 pg.

Novalink™ Laundry Information System, ControlMaster Version 2.0 for Windows User's Guide, 2000, 39 pp.

Persyst Inc., "LDAS-2000 Remote Information Control and Management System for the Commercial Laundry and Vending Industry," U.S. Appl. No. 10/436,454 on May 20, 2005, 4 pp.

Persyst Inc., "Dial-A-Wash Automatic Laundry Room Attendant for Apartment and Complex Laundry Rooms," U.S. Appl. No. 10/436,454 on May 20, 2005 , 2 pp.

PowerPoint Presentation: "Ecolab® Aramark Uniform Services Joining Forces for Service Excellence," 1998, 69 pp.

T-Jet™ 2000 PC, "Wash-Aisle Productivity Manager Software Guide," Ecolab® Textile Care Division, U.S. Appl. No. 10/436,454 on May 20, 2005, 29 pp.

Response to Office Action dated Aug. 29, 2012, from U.S. Appl. No. 12/567,266, filed Nov. 28, 2012, 10 pp.

Office Action from U.S. Appl. No. 11/713,964, dated Jul. 7, 2010, 8 pp.

Response to Office Action dated Jul. 7, 2010, from U.S. Appl. No. 11/713,964, filed Oct. 6, 2010, 7 pp.

Response to Office Action mailed Mar. 18, 2013, from U.S. Appl. No. 11/570,411, filed Jun. 18, 2013, 12 pp.

* cited by examiner

IMPACT LOAD PROTECTION FOR MASS-BASED PRODUCT DISPENSERS

TECHNICAL FIELD

This invention relates generally to chemical product dispensers.

BACKGROUND

A variety of automated chemical product dispensing systems that dispense chemical products are in use today. These chemical products come in a variety of forms, including, for example, fluids, solid product concentrates, powders, pellets, gels, extruded solids, etc. Automated chemical product dispensers are useful in many different chemical application systems, including cleaning systems relating to laundry operations, warewashing operations (e.g., a dishwasher), water treatment operations, and pool and spa maintenance, as well as other systems, such as food and beverage operations and agricultural operations. For example, chemical products used in a warewashing operation may include detergent, deionized water, sanitizers, stain removers, etc. Chemistry used in agriculture may include without limitation pesticides, herbicides, hydration agents and fertilizers. Other applications of the present invention may be used in, without limitation, dairies and dairy farms, (e.g., in teat dips); breweries; packing plants; pools spas, and other recreational water facilities; water treatment facilities, and cruise lines. Other chemical products may include without limitation glass cleaning chemicals, hard surface cleaners, antimicrobials, germicides, lubricants, water treatment chemicals, rust inhibitors, etc.

In some dispensing applications, it is desirable to know how much of the product has been dispensed. One type of system which measures how much of a chemical product has been dispensed determines the dispensed amount of chemical product based on mass. In one such system, a chemical product is dispensed by spraying a solid block of the chemical product with a diluent. A resultant use solution is created through erosion and dissolving of the chemical product via the diluent. A weight measurement instrument, such as one or more load cells, measure the weight of the chemical product remaining in the dispenser at various times throughout the dispensing cycle. The dispenser includes a controller that determines a change in weight of the chemical product remaining in the dispenser and thus determines the amount (or weight) of chemical product dispensed. Examples of such mass-based dispensing systems are described in U.S. Pat. No. 7,201,290 to Mehus et al., issued Apr. 10, 2007, U.S. Pat. No. 7,410,623 to Mehus et al., issued Aug. 12, 2008, and U.S. patent application Ser. No. 10/436,454, filed May 12, 2003, each of which is incorporated herein by reference in their entirety.

SUMMARY

In general, the invention is directed to a chemical product dispenser that controls dispensation of the chemical product based on a change in weight of the chemical product remaining in the dispenser. The dispenser includes a weight measurement instrument, such as one or more load cells, that measures the weight of the chemical product remaining in the dispenser. The dispenser includes an isolation mechanism configured to lift the chemical product from a lowered position in which the weight of the chemical product is fully supported by the load cell(s) to a raised position in which the weight of the chemical product is fully supported by the isolation mechanism. In some examples, movement of the isolation mechanism from the lowered position to the raised position may unlock a door of the dispenser.

In one example, the invention is direct to a dispenser that controls dispensation of a chemical product based on a change in weight of the chemical product remaining in the dispenser, comprising a weight measurement instrument that generates one or more electrical signals indicative of the weight of the chemical product remaining in the dispenser, a product holder configured to receive the chemical product, and an isolation mechanism configured to lift the product holder from a lowered position to a raised position, the isolation mechanism comprising an actuator, a cam operatively connected to the actuator, and a lift plate configured to engage with the cam and configured to engage with the product holder, wherein rotation of the actuator produces a corresponding rotation of the cam such that an eccentric portion of the cam engages the lift plate and moves the lift plate and the product holder from the lowered position in which the weight of the chemical product is fully supported by the weight measurement instrument to the raised position in which the weight of the chemical product is fully supported by the lift plate. The dispenser may further include a door and a lock, wherein raising of the lift plate from the lowered position to the raised position unlocks the door.

In another example, the invention is directed to a dispenser that controls dispensation of a chemical product based on a change in weight of the chemical product remaining in the dispenser, comprising a housing having a door pivotally movable between a closed position and an open position, a weight measurement instrument that generates one or more electrical signals indicative of the weight of the chemical product remaining in the dispenser, a product holder positioned inside of the housing and configured to receive the chemical product, and an isolation mechanism mounted on the door of the housing and configured to move the product holder between a lowered position in which the weight of the chemical product is fully supported by the weight measurement instrument when the door is in the closed position and a raised position in which the weight of the chemical product is fully supported by the isolation mechanism.

In another example, the invention is directed an apparatus in a dispensing system that controls dispensation of a chemical product based on a change in weight of the chemical product remaining in the dispenser, the apparatus comprising an actuator, a cam operatively connected to the actuator, and a lift plate configured to engage with the cam and to engage with a product holder that contains the chemical product, wherein rotation of the actuator produces a corresponding rotation of the cam such that an eccentric portion of the cam engages the lift plate, moving the lift plate and the product holder from a lowered position in which the weight of the chemical product is fully supported by a weight measurement instrument that determines the weight of the chemical product to a raised position in which the weight of the chemical product is fully supported by the lift plate and in which the weight measurement instrument is physically isolated from the weight of the chemical product.

The details of one or more embodiments of the invention are set forth in the accompanying drawings and the description below. Other features, objects, and advantages of the invention will be apparent from the description and drawings, and from the claims.

DETAILED DESCRIPTION

In general, the invention is directed to a chemical product dispenser that controls dispensation of the chemical product based on a change in weight of the chemical product remaining in the dispenser. The dispenser includes a weight measurement instrument, such as one or more load cells, that measures the weight of the chemical product remaining in the dispenser. The dispenser includes an isolation mechanism configured to lift the chemical product from a lowered position in which the weight of the chemical product is fully supported by the load cell(s) to a raised position in which the weight of the chemical product is fully supported by the isolation mechanism. In some examples, once the chemical product is in the raised position, an operator may load the dispenser with a supply of chemical product. In other examples, movement of the isolation mechanism from the lowered position to the raised position also unlocks a door of the dispenser. Once the door is unlocked and the chemical product is in the raised position, a user may open the door and load the dispenser with a supply of chemical product.

Figure 1:
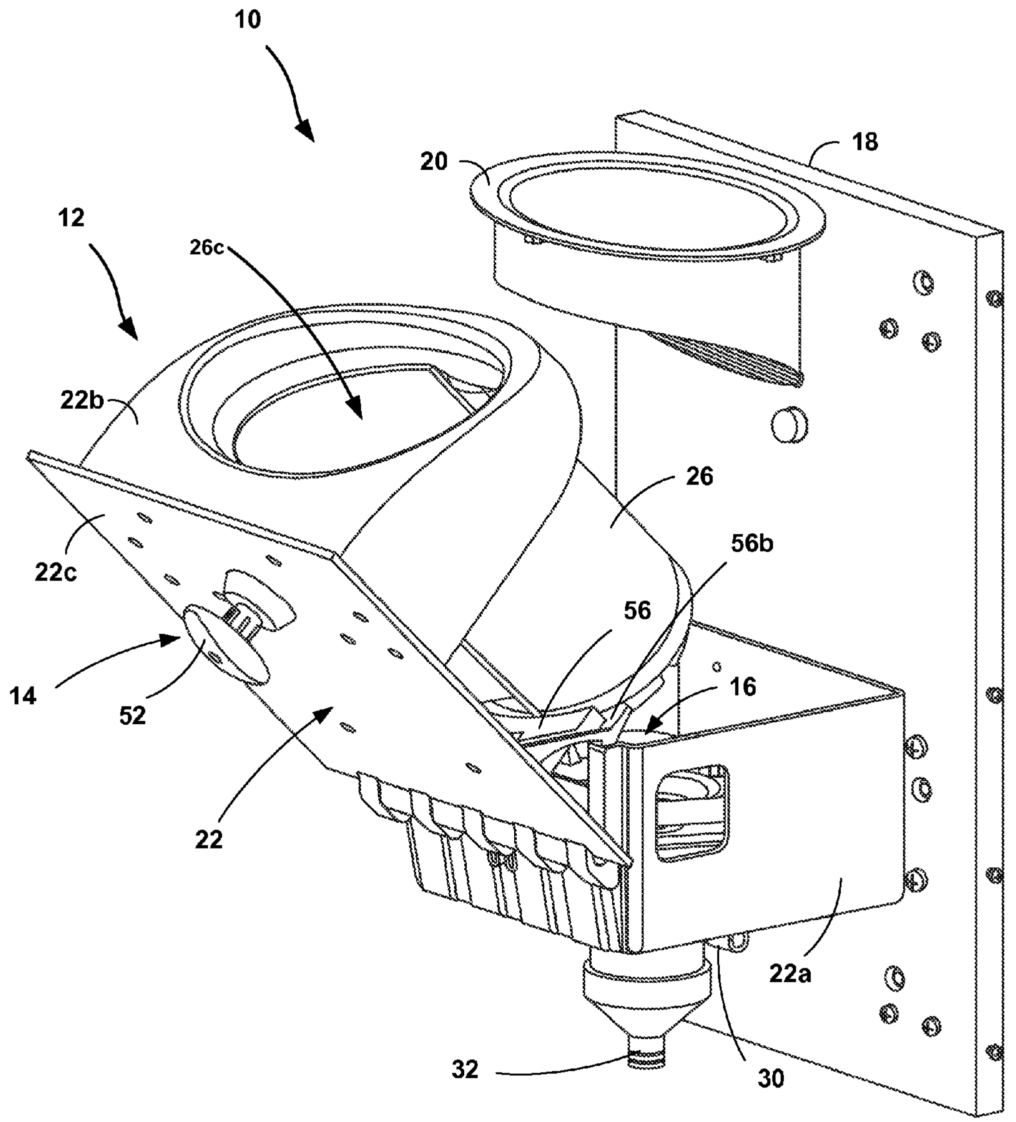
FIG. 1 is a perspective view of a dispensing system.

FIG. 1 is a perspective schematic view of an example dispensing system 10. Dispensing system 10 includes a dispenser 12 from which a chemical product is dispensed based on a change in mass or weight of the chemical product remaining in the dispenser 12. Dispenser 12 includes a product holder 26 having a cavity 26*c* which receives the chemical product to be dispensed. Dispenser 12 also includes a housing 22 having a door 22*c*. In FIG. 1, door 22*c* is in an open position so that a supply of chemical product may be loaded into cavity 26*c* of product holder 26. Dispenser 12 further includes one or more load cell(s) within a load cell housing 16. The load cell(s) generate electrical signals indicative of the weight of the chemical product remaining in the dispenser at various times throughout the course of a dispensing cycle. Dispenser 12 also includes a controller (FIG. 7) that controls dispensation of the chemical product based on a change in weight of the chemical product remaining in the dispenser.

The example dispensing system 10 shown in FIG. 1 and described in detail herein is of the type that dispenses the chemical product by spraying a solid block of the chemical product with a diluent. However, it shall be understood that the invention may also be used in combination with other weight based dispensing systems, such as those that dispense liquids, pastes, gels, powders, pellets or other forms of chemical product based on a change in weight of the chemical product remaining in the dispenser, and that he invention is not limited in this respect.

Example dispensing system 10 includes a housing 22 having a base 22*a*, a hood 22*b* and door 22*c*. An isolation mechanism 14, in this example a handle 52 on the exterior of housing 22 and a product lifter 56 on the interior of housing 22, are configured to raise and lower product holder 26. As will be described in further detail below, when in the lowered position, the weight of the chemical product is fully supported by the load cell(s) or other weight measurement instrument, and the weight of the chemical product remaining in the dispenser may be measured. When in the raised position, the weight of the chemical product remaining in the dispenser are fully supported by the isolation mechanism rather than by the load cells. The load cells are thus physically isolated from the weight of the chemical product when the product holder is in the raised position, potentially reducing damage to the load cells from impact shock or jarring that might occur when a supply of the chemical product is dropped into the dispenser 12.

In the example of FIG. 1, dispenser 12 includes a mounting panel 18 that allows the dispenser 12 to be mounted to a support surface, such as a wall of a room or other surface that is sturdy enough to support dispenser 12. In this example, mounting panel 18 includes a number of openings 18*a* through which a number of fasteners 18*b* may be employed to secure panel 18 and dispenser 12 to a stable support structure. In other examples, rather than using mounting panel 18, it shall be understood that dispenser 12 may be secured in various other ways such as with a free-standing dispensing structure, and that the invention is not limited in this respect.

Dispenser 12 further includes a lid 20 that covers cavity 26*c* of product holder 26 when door 22*c* of dispenser 12 is closed to prevent moisture or other contaminants from entering product holder 26. In this example, lid 20 is connected to mounting panel 18. However, for simplicity, the mounting structure connecting lid 20 to mounting panel 18 is omitted from FIGS. 1-5.

Figure 2:
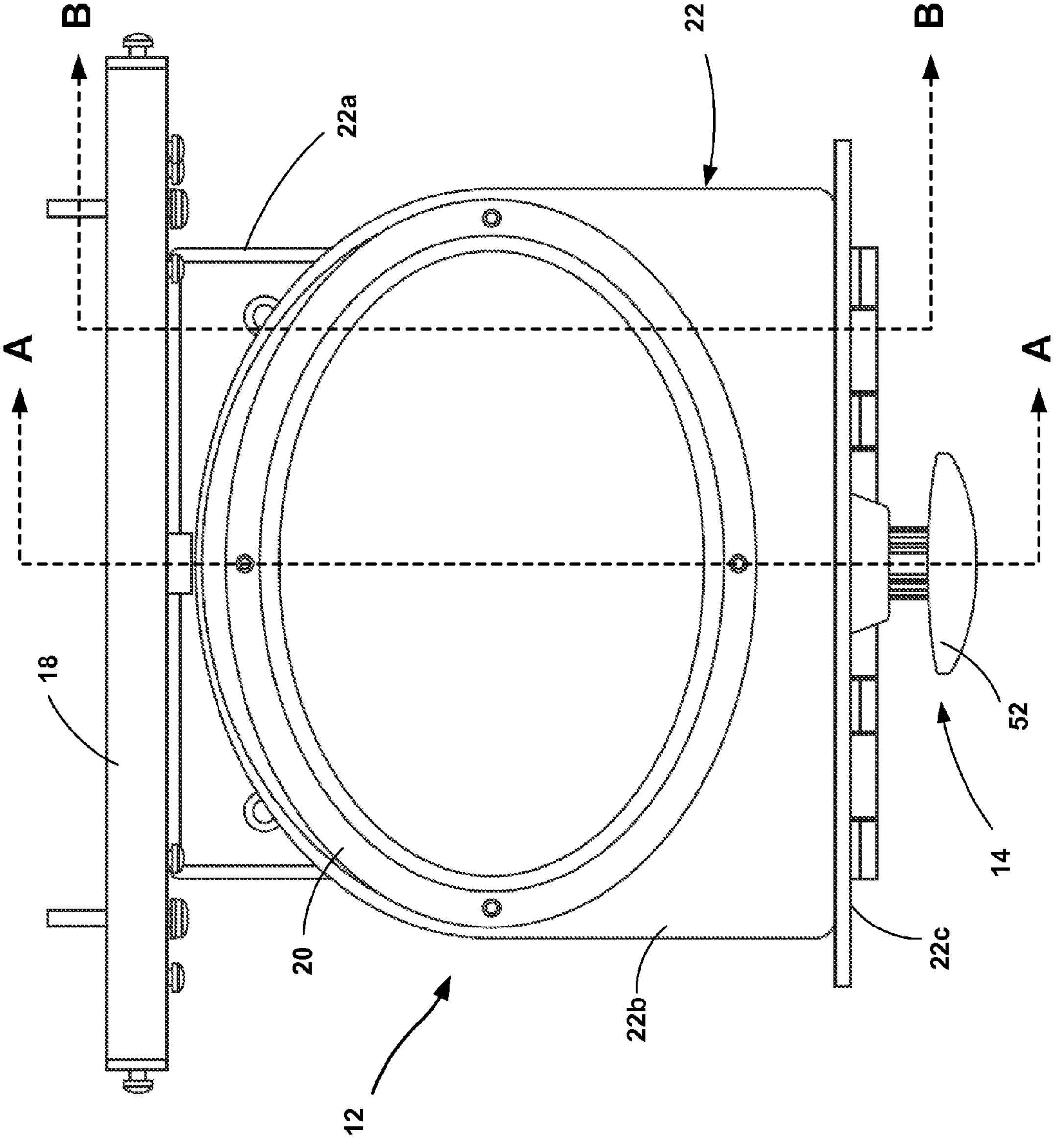
FIG. 2 is a plan view from above of the dispensing system of FIG. 1.
Figure 3A:
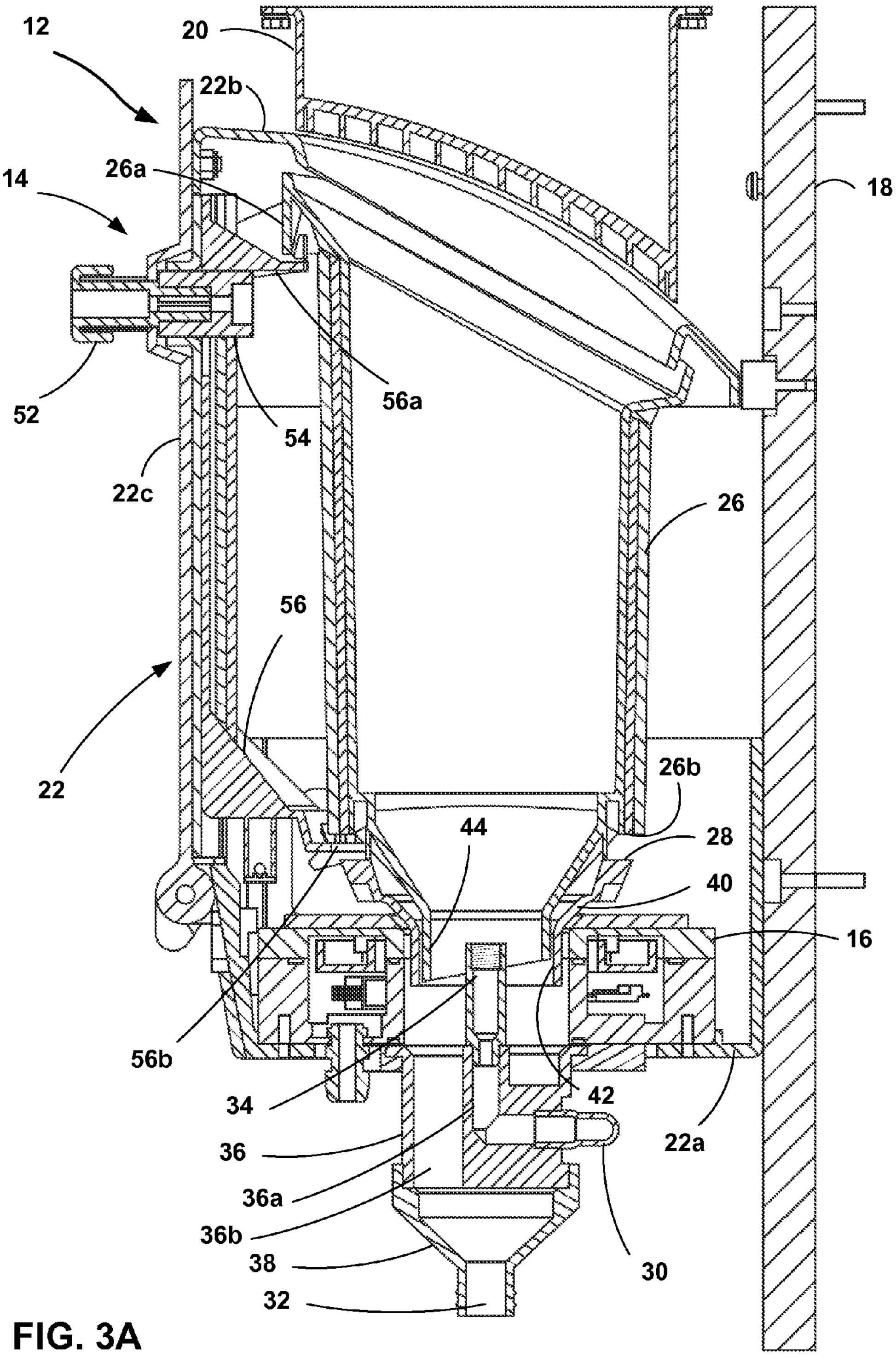
FIGS. 3A and 3B are section views of the dispensing system of FIG. 1 with the isolation mechanism and the product holder in the lowered position.
Figure 3B:
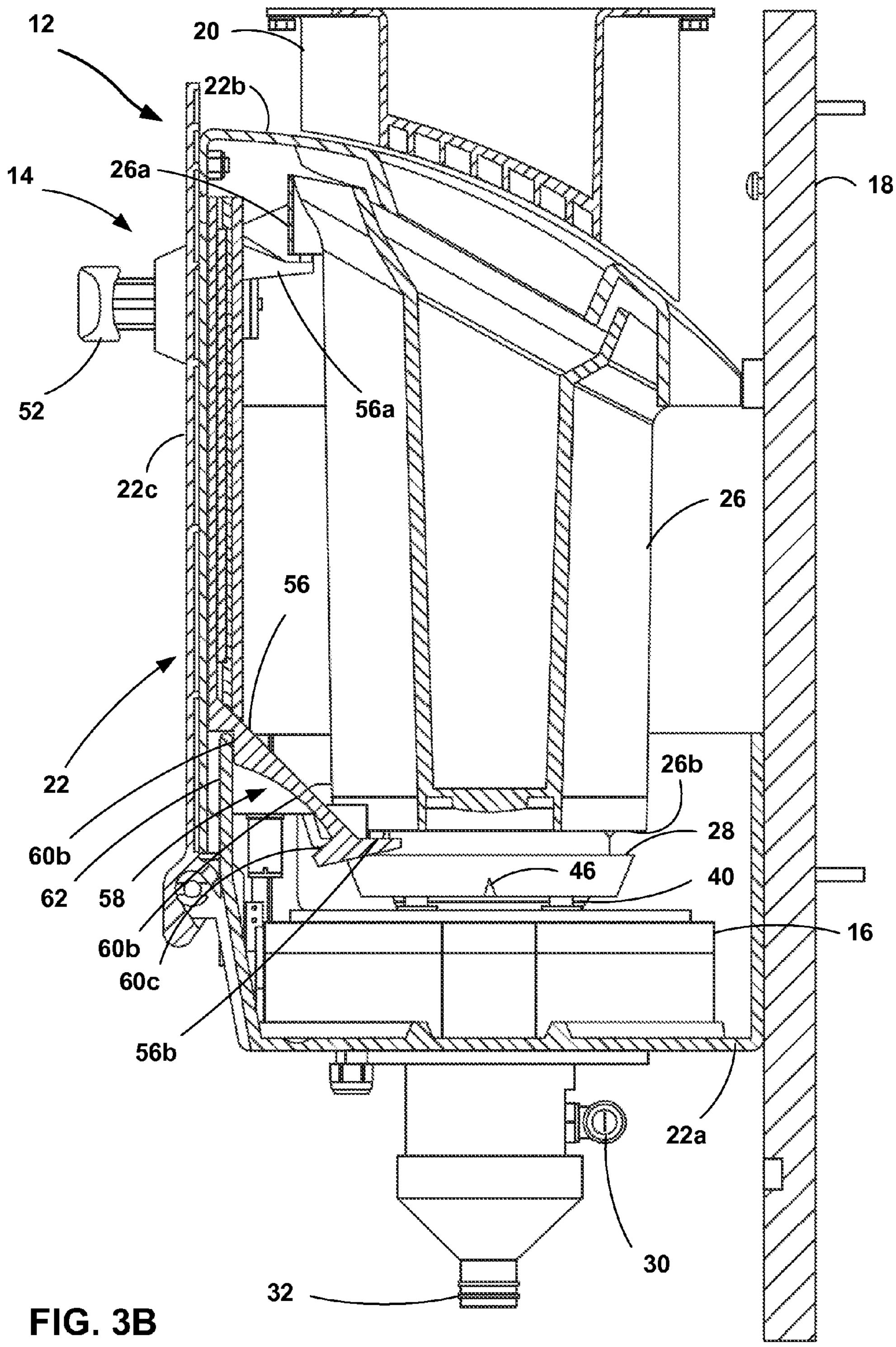
Figure 4A:
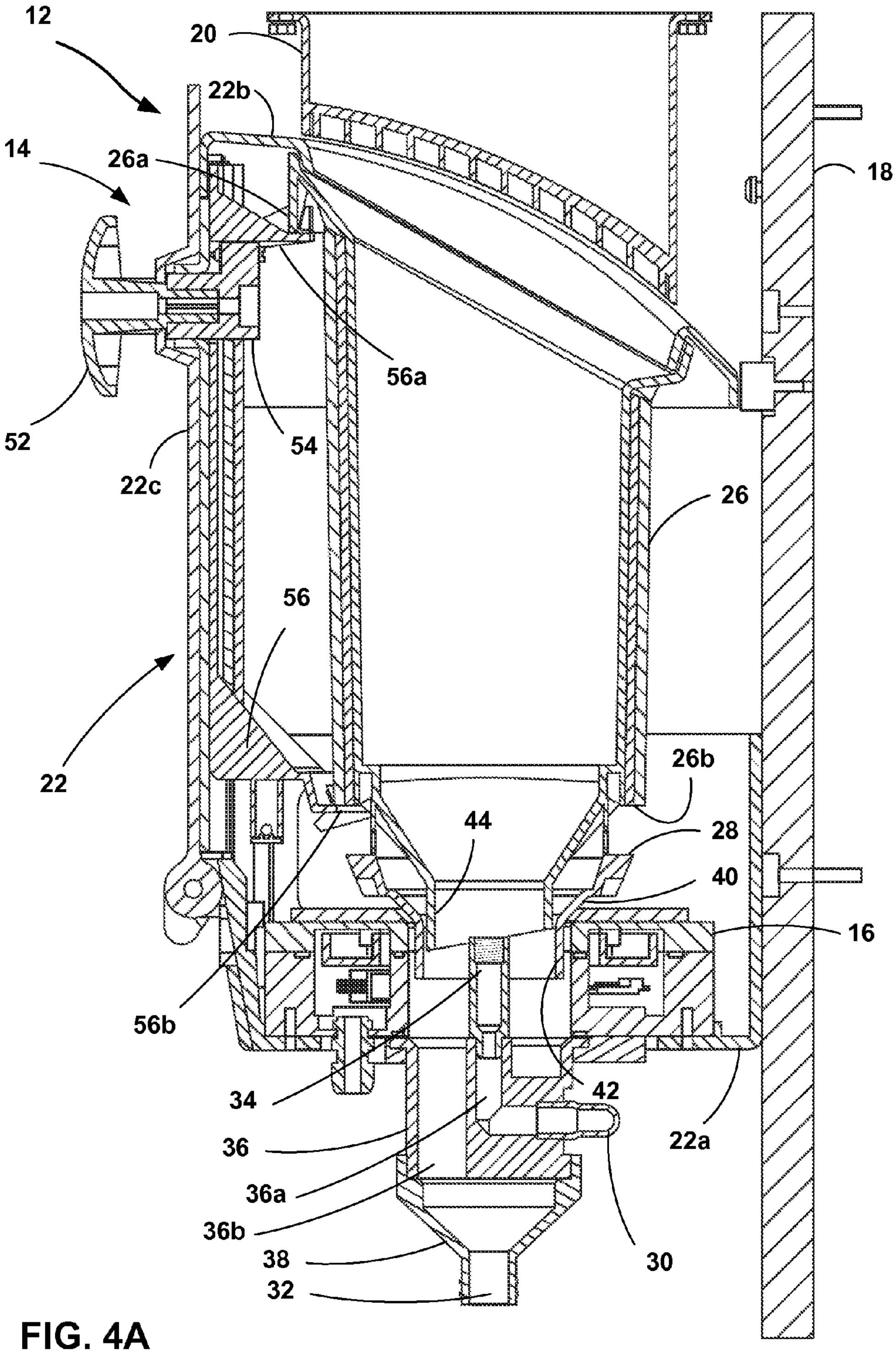
FIGS. 4A and 4B are section views of the dispensing system of FIG. 1 with the isolation mechanism and the product holder in the raised position.
Figure 4B:
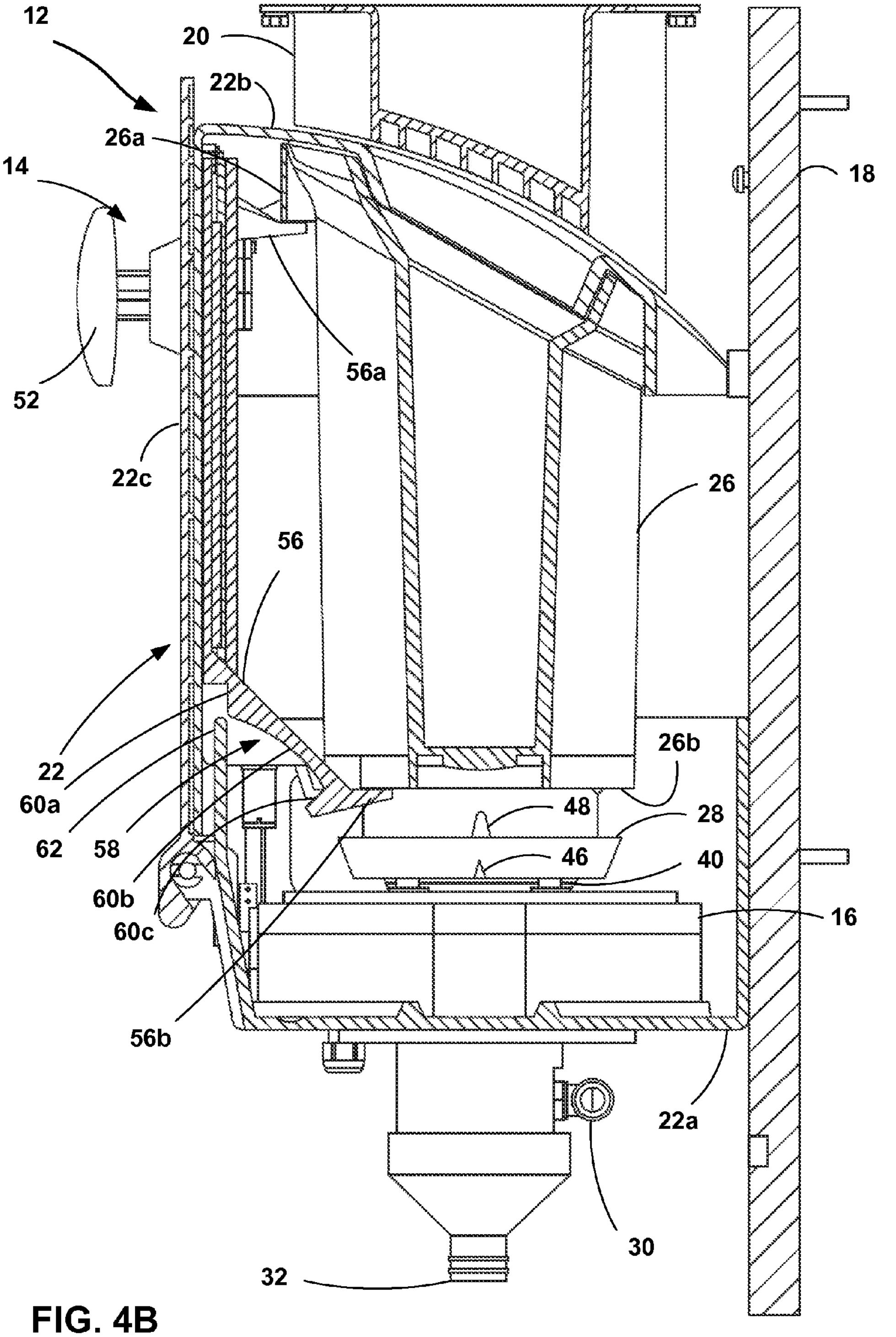
Figure 5:
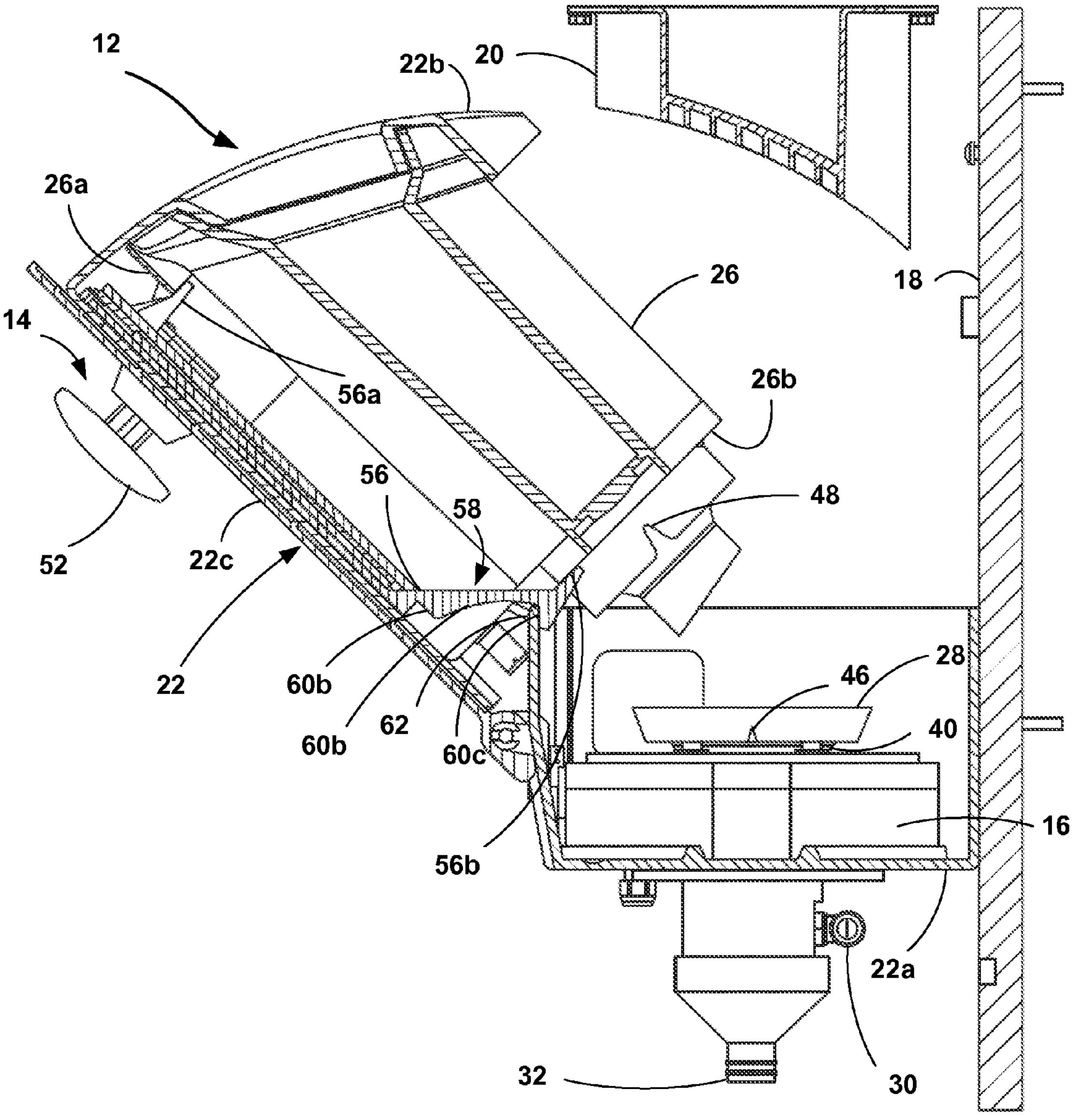
FIG. 5 is a section view of the dispensing system of FIG. 1 having the door in an open position.

FIGS. 2-5 are further schematic views of dispensing system 10 shown in FIG. 1. FIG. 2 is a plan view from above of dispensing system 10. FIGS. 3A and 3B are section views of dispensing system 10 with product lifter 56 in the lowered position. FIGS. 4A and 4B are section views of dispensing system 10 with product lifter 56 in the raised position. The section views of FIGS. 3A and 4A are cut along section line A-A shown in FIG. 2. The section views of FIGS. 3B and 4B are cut along section line B-B shown in FIG. 2. FIG. 5 is a section view of dispenser 12 with door 22*c* in an open position that permits an operator to load dispenser 12 with a supply of chemical product.

In this example, dispenser 12 further includes a product tray 28, a diluent inlet 30, an outlet 32, and a spray nozzle 34 (see FIGS. 3A and 4A). Inlet 30 is connected to a conduit including, e.g., an inlet hose connected between a supply of diluent and the inlet of housing 22. Similarly, outlet 32 is connected to a conduit for transmitting the use solution of product and diluent to a desired location, or may dispense the use solution directly to the desired location.

In operation, dispensing system 10 dispenses a chemical product to one or more locations and/or devices. In example dispensing system 10, a diluent is directed through inlet 30 under pressure into product holder 26 and housing 22. The chemical product may be loaded directly into cavity 26*c* of product holder 26 or may be contained within a product capsule, which is itself loaded into product holder 26. Application of the diluent to the chemical product results in, through a combination of erosion and dissolving of the chemical product, formation a use solution. The use solution flows toward the bottom of product holder 26 and is directed through outlet 32 to be delivered to a desired location or locations.

In order to control the amount of chemical product dispensed (for example, to achieve a target concentration of chemical product in the resulting use solution), dispensing system 10 monitors the weight of the chemical product remaining in the dispenser 12. A weight measurement instrument, such as one or more load cell(s) within a load cell housing 16 (see FIGS. 3A, 3B, 4A and 4B) generate electrical signals indicative of the weight of the chemical product remaining in dispenser 12 at various times throughout the dispensing cycle. (The combination of the load cell(s) and load cell housing will be generally referred herein to as "load cells 16"). The signals generated by load cells 16 may then be processed, e.g. by an electronic controller, in order to determine when a target amount of chemical product has been dispensed and to stop application of the diluent. In this way, dispensing system 10 is able to control the amount (weight) of chemical product dispensed.

Inlet 30 and outlet 32 of housing 22 are arranged in the bottom of base 22*a*, which generally functions as a sump region to collect the use solution created from the diluent and the chemical product in product holder 26. Inlet 30 is a generally cylindrical member that connects to collar 36 extending down from base 22*a*. In particular, inlet 30 connects to inlet channel 36*a* in collar 36, to which, in turn, spray nozzle 34 is connected. An inlet conduit, e.g. an inlet hose may be connected to inlet 30 to transmit a diluent supply into a cavity product holder 26 under pressure. A separate spray nozzle 34 may be utilized to further direct the diluent. Outlet 32 is formed in funnel 38 connected to collar 36. Outlet channel 36*b* in collar 36 leads to funnel 38 and outlet 32, to which an outlet conduit, e.g. an outlet hose is connected. The outlet hose directs the use solution to a desired location. For example, a use solution including water and detergent may be directed to a dishwashing machine or to multiple machines. In another example, the use solution may be directed to one or more laundry washing machines. In general, the chemical product may be dispensed to any desired dispensing site, such as a container (bucket, pail, tank, etc.), wash environment (dishwasher, laundry machine, car wash, etc.), machinery (food or beverage processing equipment, manufacturing facility, etc.) or other environment in which the chemical product is to be used.

In this example, dispenser 12 includes a product tray 28. Product tray 28 has an upper, conically shaped section 40, which includes a top rim from which conical section 40 extends down to connect to generally cylindrical section 42. Cylindrical section 42 of product tray 28 is sized and shaped to receive neck 44 of product holder 26. Neck 44 forms an opening through which diluent may be sprayed by nozzle 34. Product tray 28 also includes a number of tapered tabs 46 (see FIGS. 3B and 4B) distributed around an interior surface of conical section 40. Tabs 46 are generally sized and shaped to be received within corresponding notches 48 (see FIG. 4B) in the bottom of product holder 26. Employing tapered tabs 46 on product tray 28 and notches 48 on product holder 26 may provide greater dimensional tolerance for locating the holder in dispenser 12, i.e. may allow for greater lateral displacement of the holder with respect to the tray when the product holder 26 is lowered into tray 28. Although a product tray is used in this example, it shall be understood that other embodiments may be employed which do not include a product tray, or that the product tray may have different configurations, and that the invention is not limited in this respect.

Although the example dispensing system 10 shown herein is described with respect to dispensing solid block of chemical product, dispensing system 10 may dispense other forms of chemical product, including, for example, briquettes, fluids, solid product concentrates, powders, pellets, tablets, gels, pastes, pressed or extruded solids, etc. The chemical product may be contained within a product capsule or may be loaded directly into the dispenser. Because the purpose of the load cell 16 is to determine the amount (weight) of chemical product remaining in the dispenser, the dispenser may be designed such that the weight of the chemical product is fully supported by the load cells 16 at those times during the dispensing cycle when the amount of chemical product remaining in the dispenser is determined. This would allow many different types of chemical products to be dispensed.

Example dispenser 12 includes a diluent spray that sprays upward from below to erode the chemical product in product holder 26. However, other designs may be utilized in which the diluent enters at other locations and/or from other directions, such as from the top or from the side. In examples in which erosion is employed, the erosion may be by spray, as previously described, by flooding or by other means of applying a diluent. The product may also be ground away or drilled out by mechanical action including, e.g., drilling or grinding.

Referring again to FIGS. 1-5, and, in particular to FIGS. 3A and 3B, when a chemical product or product capsule containing a chemical product is placed in cavity 26*c* of product holder 26, and when the isolation mechanism 14 moves product holder 26 to the lowered position, the weight of the chemical product is fully supported by load cell 16. In addition, in this example, the weight of the product holder, the product capsule (if any), and the product tray are also fully supported by load cell 16.

At various times during a product dispense cycle, or continuously in some examples, a controller receives electrical signals generated by load cells 16 that are indicative of the weight of the amount of chemical product remaining in dispenser 12. Dispenser 12 is calibrated such that the weight of the product holder, the product capsule (if any), the product tray and any other parts of the dispenser itself are zeroed out. The signals generated by load cell 16 may then be processed to determine when a target amount (weight) of chemical product has been dispensed and when to stop the spray of diluent onto the chemical product. In this way, dispenser 12 controls the spray of diluent based on the amount of chemical product remaining in the dispenser such that a target amount (weight) of chemical product is dispensed.

The particular load cell employed in dispensing system 10, and other similar systems, may vary depending upon factors such as the maximum weight of the chemical product in the dispenser (such as when a new supply of chemical product is loaded), a target amount of chemical product to be dispensed, the dispenser type, etc. A typical product capsule weight, including chemical product, is between 8 to 10 pounds. In such cases, a 5 kilogram (11 pound) load cell may be selected.

However, other load cells may be used, and the load cell is generally chosen as appropriate for the weight of the product to be measured. In general, load cell 16 includes at least one load beam and strain gauge attached thereto. The weight of the product in dispenser 12 causes the load beam to deflect, which deflection is reflected in a change in an electrical signal produced by the strain gauge including, e.g., a change in voltage or capacitance produced by the gauge. The change in the electrical signal is then processed to determine the weight of the product. Different types of load beams may be employed in load cell 16 including, e.g., blade and/or binocular load beams.

As the chemical product is dispensed, the amount (weight) of chemical product remaining the dispenser decreases. At some point, the dispenser will run out of chemical product. Usually this point, an operator manually refills the dispenser by loading a new supply of chemical product into the dispenser. However, personnel responsible for loading chemical product into the dispenser may sometimes drop or throw the chemical product or capsule into cavity 26*c* of product holder 26. If the weight of the chemical product holder 26 is supported by the load cell 16 during these times, the load cells may be damaged by the resulting impact forces resulting from such throwing or dropping.

One issue is therefore to protect the load cell from impact forces experienced when a supply of chemical product is loaded into the dispenser. The techniques described herein seek to physically isolate the weight of the chemical product from load cell 16 during loading of the dispenser. In one example, dispenser 12 includes an isolation mechanism 14 configured to lift the chemical product to a raised position at those times when the dispenser is to be loaded with a supply of chemical product, thus isolating load cell 16 from impact forces which may be experienced when the chemical product is loaded into dispenser 12.

To that end, isolation mechanism 14 includes a handle 52, a cam 54 and a lift plate 56. (Operation of this example isolation mechanism is also described below with respect to FIGS. 8-11.) In FIGS. 3A and 3B, isolation mechanism 14 is in the locked position, door 22*c* is in the closed position and isolation mechanism 14/product holder 26 are in the lowered position. Load cells 16 thus fully support the weight of product holder 26, the chemical product and any product capsule and product tray 28. In this position, load cell 16 is able to accurately measure the weight of the chemical product remaining in dispenser 12.

In FIGS. 4A and 4B, isolation mechanism 14 has been actuated to lift product holder 26 off of the product tray such that the weight of the product holder and the chemical product/capsule contained therein is fully supported by the isolation mechanism. In FIGS. 4A and 4B, therefore, the weight of product holder 26 and chemical product contained therein are no longer supported by load cell 16. In FIGS. 4A and 4B isolation mechanism 14 is in the unlocked position, door 22*c* is in the closed position and product holder 26 is in the raised position. In this example, isolation mechanism 14 also unlocks door 22*c* of housing 22 such that the door may be opened as shown in FIG. 5 (and FIG. 1) to facilitate loading of the dispenser with a supply of chemical product. However, it shall be understood that separate lift and lock mechanisms could also be used without departing from the scope of the present invention.

FIG. 5 shows door 22*c* of housing 22 in an open position so that a supply of chemical product may be loaded into dispenser 12. In FIG. 5, isolation mechanism 14 is the unlocked position, door 22*c* is in the open position and product holder 26 is in the raised position.

When the supply of chemical product has been loaded into dispenser 12, an operator may close door 22*c*. In this example, door 22*c* and isolation mechanism 14 are designed such that door 22*c* may only be closed with the isolation mechanism is in the unlocked position. Because the isolation mechanism must be in the unlocked position when the door is closed in this example, the product holder remains in the raised position with the weight of product holder 26 and the chemical product/capsule contained therein fully supported by the isolation mechanism 14. Once the door is closed, the isolation mechanism may be actuated to lock the door and simultaneously move product holder 26 into the lowered position such that the weight of product holder 26 and the chemical product/capsule contained therein is fully supported by the load cells 16. In this example, lowering the product capsule after the door is closed may reduce impact forces on load cells 16 that might occur if the product capsule could be moved into the lowered position by the action of closing the door.

In FIGS. 1-5, and, in particular in FIGS. 3A-5, isolation mechanism 14 includes a handle 52, a cam 54, a lift plate 56, and a door latch assembly 58. Handle 52 is connected to cam 54 via an aperture in door 22*c*. Lift plate 56 is slidably connected to door 22*c*. For example, lift plate 56 may be received by two vertical rails (see FIGS. 8 and 9) on door 22*c* such that the lift plate may slide along the rails with respect to the door. The rails may include active components to facilitate the movement of lift plate 56 including, e.g., ball or roller bearings. In other examples, the rails are constructed of a low friction material over which lift plate 56 slides with relatively low resistance. Lift plate 56 includes two flanges 56*a*, 56*b* that engage product holder 26 at lip 26*a* and shoulder 26*b* respectively. Additionally, cam 54 connected to handle 52 is positioned to engage a bottom portion of flange 56*a*. The flange thus functions as a lever to the cam.

Door latch assembly 58 includes a latch 60 and a bolt 62 (see, e.g., FIG. 4B). Latch 60 includes a first stop 60*a* connected to track 60*b*, to which is connected a second stop 60*c*. In the example of FIGS. 1-5, latch 60 is formed as part of lift plate 56. However, in other examples, lift plate 56 and latch 60 may be constructed as separate components. Similarly, in the example of FIGS. 1-5, bolt 62 is formed as part of case 22*a* of housing 22, but in other examples the bolt and the housing may be constructed as separate components.

In FIG. 3A, product holder 26 is loaded on product tray 28 and load cell 16. Lift plate 56, and thus product holder 26 is in the lowered position within dispenser 12 shown in FIGS. 3A and 3B. When product holder 26 is in the lowered position, handle 52 is positioned such that the eccentric lobe of cam 54 does not engage flange 56*a* of lift plate 56.

The section view of FIG. 3B also shows product holder 26 loaded on product tray 28 and load cell 16, but the section is cut along section line B-B of FIG. 2 to reveal the details of door latch assembly 58. In FIG. 3B, door 22*c* is locked to prevent an operator from opening the door and loading a supply of chemical product into product holder 26 without first moving the product holder into the raised position. Door 22*c* is locked by bolt 62 engaging latch 60, and, in particular by bolt 62 engaging first stop 60*a* of latch 60. In this position, presence of bolt 60 in front of stop 60*a* prevents door 22*c* from being opened.

In FIGS. 4A and 4B, isolation mechanism 14 has been actuated by, e.g., an operator twisting handle 52 approximately 90 degrees. In FIG. 4A, isolation mechanism 14 is in the unlocked position, product holder is in the raised position, and door 22 is in the closed position. As illustrated in FIG. 4A, twisting of handle 52 causes eccentric lobe 54*a* of cam 54 to engage the bottom of flange 56*a* on lift plate 56, causing lift plate 56 to rise thus lifting product holder 26 off of the product tray. Initially, as cam 54 begins to rotate from the locked position (shown in FIG. 3A), the side of cam 54 engages flange 56*a* and lift plate 56 begins to rise. Flanges 56*a* and 56*b* of lift plate 56 engage product holder 26 thus lifting the product holder off of product tray 28 and consequently off of load cell 16, until the product holder is at its maximum lift point, namely the raised position shown in FIG. 4A.

In other examples, the size and contour of cam 54 may be changed to tune the amount lift plate 56 is displaced by the action of the isolation mechanism. Additionally, the bottom of flange 56*a* may be contoured in accordance with the shape of cam 56 to receive the cam and facilitate a smooth lifting motion of lift plate 56 and product holder 26. Also, instead of actuating the raising and lifting of product holder 26 via rotation, isolation mechanism 14 may be actuated by some other mechanical motion such as vertical or lateral translation, pushing in or pulling out, etc.

As illustrated in the example of FIG. 4B, engaging isolation mechanism 14 to lift product holder 26 off of product tray 28 and load cell 16 simultaneously unlocks door 22*c* of housing 22. That is, the product holder 26 is lifted upwards such that first stop 60*a* of latch 60 is disengaged from bolt 62. After bolt 62 is no longer engaged by first stop 60*a* of latch 60, door 22*c* is unlocked and capable of being opened to provide access to product holder 26.

Having lifted the product holder 26 to the raised position and having unlocked door 22*c*, an operator is free to open the door as shown in FIG. 5 to reload chemical product into the product holder 26. Door 22*c* pivots on hinge 51 with respect to case 22*a* of housing 22 to open outward carrying lift plate 56 and product holder 26. As door 22*c* swings open, bolt 62 of door latch assembly 58 travels along track 60*b* of latch 60. Movement of bolt 62 along track 60*b* guides door 22*c* as it swings open. The fully open position of door 22*c* is defined by second stop 60*c* of latch 60. In FIG. 5, door 22*c* is completely opened such that bolt 62 engages second stop 60*c* to prevent the door from pivoting further.

In this example, once the operator loads the supply of chemical product into product holder 26, the operator may close door 22*c* and twist handle 52 counterclockwise approximately 90 degrees to cause the lobe of cam 54 to disengage flange 56*a* of lift plate 56. As handle 52 and cam 54 twist counterclockwise, lift plate 56 lowers product holder 26 into the lowered position such that the weight of the product holder 26 and the chemical product/capsule contained therein are fully supported by the load cell 16.

In addition to protecting load cell 16 from shock by employing isolation mechanism 14, another issue to consider in designing a mass-based dispenser is to minimize the torque and to provide strain protection for the load cell of the dispenser. One way of addressing this issue is to align the forces above load cell 16 so that they are substantially vertical onto the load cell. In the example of dispenser system 10, the weight of dispenser 12 when in the closed position is in a direction substantially perpendicular to the surfaces of load cell 16 on which the weight is borne. Also, by securing case 22*a* of housing 22 in which load cell 16 is arranged to mounting panel 18, additional strain protection may be provided. Housing 22 may also act to isolate load cell 16 to prevent inadvertent jarring or movement by people passing by or other sources of force which may contact the load cell. Additionally, as with vertical shock loads, a support bracket may be employed to limit torsional rotation of a load beam of load cell 16.

Another issue to be considered is to prevent moisture from contacting load cell 16. There are several ways of addressing this issue. In one example, a hood is employed to cover dispenser 12 and prevent load cell 16 from becoming wet from splashes or sprays in, e.g., a dishwasher application in which such environmental hazards are common. Coating load cell 16 with a moisture protective coating may also prove beneficial.

Still another issue is the reduction of any vibration interference and protective measures that provide for the same. One way of reducing vibration interference is to electronically compensate for the vibration with logic in suitable software. Another solution is to physically isolate or insulate dispenser 12 from the surface or surfaces on which they are mounted. For example, cushioning materials such as air chambers or rubber may be utilized to isolate the dispensers.

Load cell 16 may also include a visible marker to indicate the maximum rated load of the load cell. The marker may be, for example, a color-coded and/or printed text emblem (e.g., a sticker), a printed marking, an embedded marker (e.g., an indentation) in the load cell, another type of marker that is visible or otherwise detectable by an operator, or any combination thereof. Markers may be used, e.g., to quickly distinguish between differently rated load cells for use in dispensing systems including, e.g., system 10. In one example, different load cells may include color coded markers including yellow for a 1 kg load cell, blue for 10 kg, red for 20 kg, and green for 50 kg.

Figure 6A:
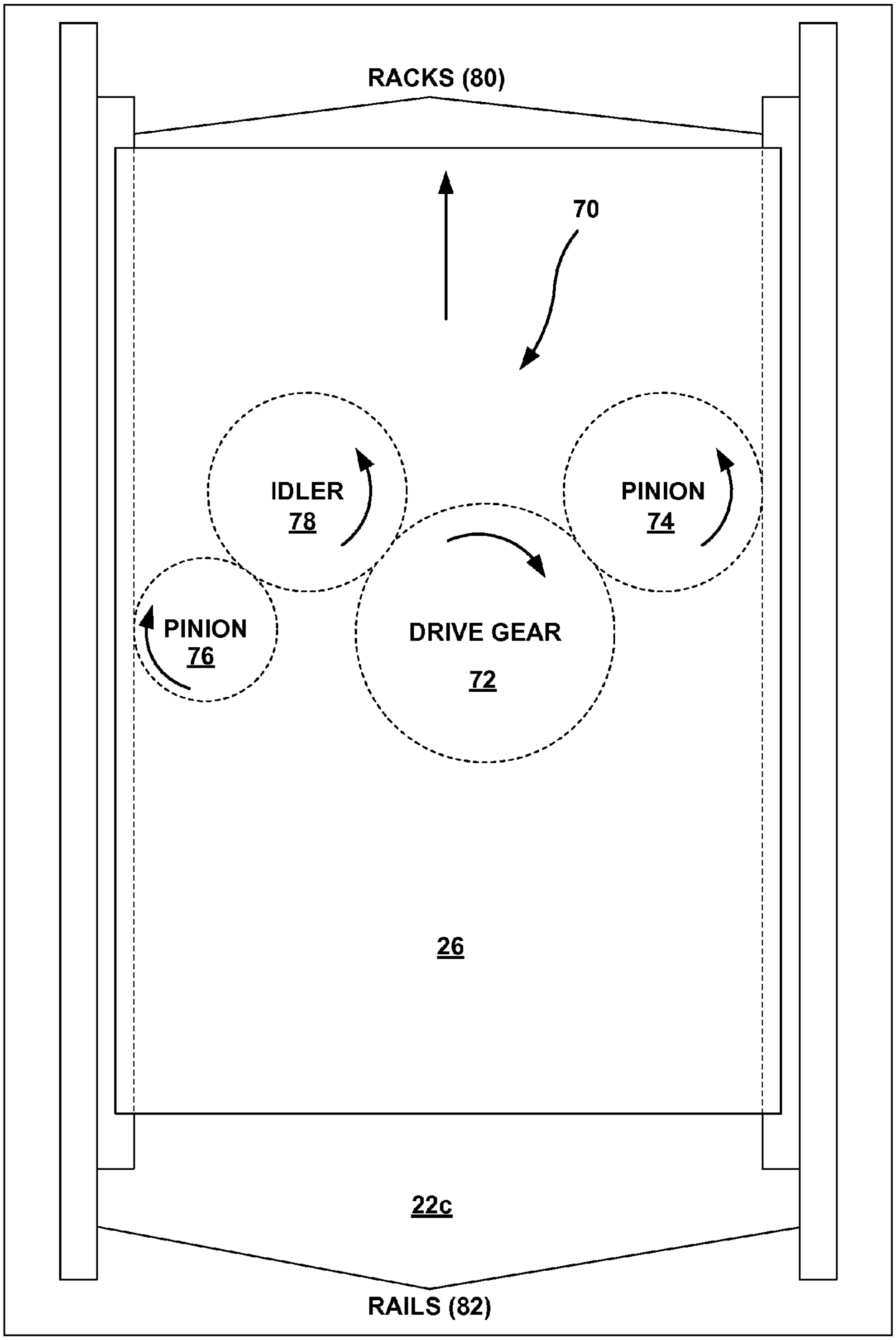
FIG. 6A is a schematic of an alternative isolation mechanism.

FIG. 6A is a schematic of an example alternative isolation mechanism 70 for isolating product holder 26 from load cell 16. For simplicity, door 22*c* and product holder 26 are illustrated in FIG. 6A disconnected from of the remaining components of dispenser 12. Isolation mechanism 70 of FIG. 6 employs a rack and pinion gear train instead of cam 54 as the kinematic isolation mechanism that, when actuated, lifts product holder 26 into the raised position. In this example, isolation mechanism 70 includes drive gear 72, pinion gears 74, 76, idler gear 78, and racks 80. The particular type of gears employed in isolation mechanism 70 may vary in different examples. Any of gears 72-80 may include, e.g., spur, helical, or worm gears.

In FIG. 6A, drive gear 72, pinion gears 74, 76, and idler gear 78 are all rotatably connected to door 22*c*. Racks 80 are connected to product holder 26. Racks 80 may be connected directly to product holder 26 or may, in a similar fashion to the example of FIGS. 1-5, be connected to a lift plate (not shown in FIG. 6) that engages or is otherwise connected to product holder 26. Isolation mechanism 70 also includes rails 82. Rails 82 are arranged vertically and connected to door 22*c*. Racks 80 and product holder 26 connected thereto are received by rails 82 such that the racks and product holder can slide up and down relative to door 22*c* along the rails. Rails 82 may include active components to facilitate the movement of racks 80 and product holder 26 including, e.g., ball or roller bearings. In other examples, the rails are constructed of a low friction material over which racks 80 slide with relatively low resistance.

In operation, an actuator (not shown) including, e.g., a handle, knob, etc., is employed to turn drive gear 72 clockwise from the perspective of the view shown in FIG. 6. Drive gear 72 causes pinion 74 and idler gear 78 to rotate. Rotating drive gear 72 clockwise causes pinion gear 74 to rotate counterclockwise, which in turn causes one of racks 80 to move, e.g., upward as shown in the example of FIG. 6. Rotating drive gear 72 clockwise also causes idler gear 78 to rotate counterclockwise. However, if idler gear 78 were arranged to engage the other rack 80 directly, the counterclockwise rotation of idler gear 78 would cause the rack to move downward and thereby lock isolation mechanism 70 into a single position. Idler gear 78 may therefore be interposed between drive gear 72 and pinion 76 in order to translate the clockwise rotation of drive gear 72 into clockwise rotation of pinion gear 76, which is required to cause the rack 80 (and thus the product holder) to move upward. Therefore, in summary, drive gear 72 is rotated clockwise by an actuator to cause pinion 74 to rotate counterclockwise to move one of racks 80 upward, and to cause pinion 74 via idler gear 78 to rotate clockwise to move the other rack 80 upward. Drive gear 72, pinions 74, 76, and idler gear 78 are sized such that the displacement of each rack 80 via pinion gear 74 and 76 respectively is substantially equal. The movement of racks 80 upward along rails 82 causes product holder 26 to move upward into the raised position.

Figure 6B:
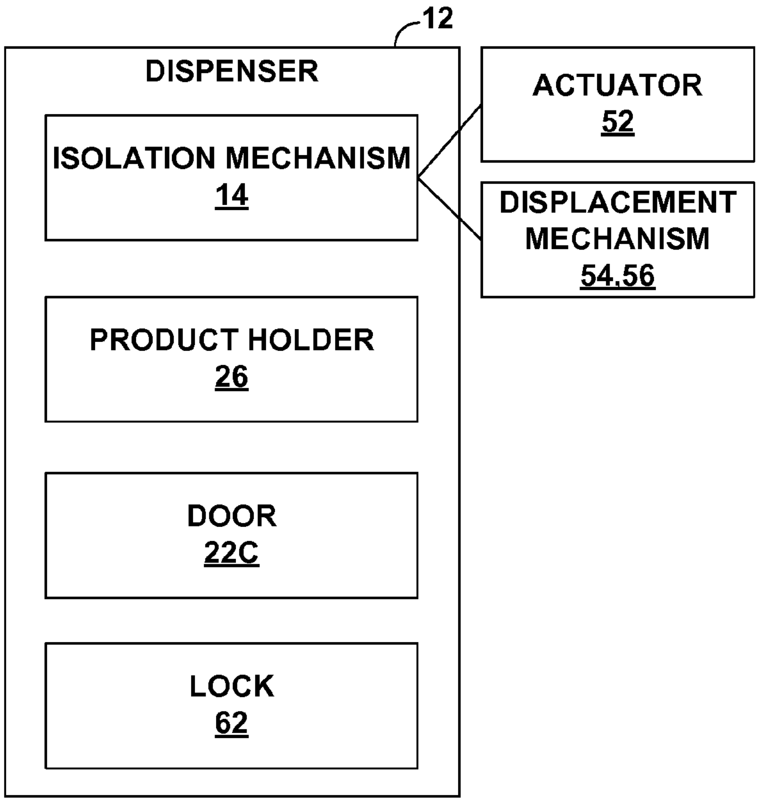
FIG. 6B is a generalized block diagram of a dispenser having an isolation mechanism that moves a chemical product from a lowered position to a raised position.

FIG. 6B is a generalized block diagram of a dispenser having an isolation mechanism that moves a chemical product from a lowered position to a raised position. Dispenser 12 includes an isolation mechanism 14, a product holder 26, a door 22*c* and a lock 62. In this example, isolation mechanism includes an actuator 52 and a displacement member. Actuation of the actuator 52 results in a reciprocating (up and down in this example) motion of displacement member 56, which results in a corresponding movement of the product holder between the lowered and raised positions. The movement of the displacement member may also result in locking and unlock of door 22*c*.

In addition to cams and gears as employed in the examples of FIGS. 1-5 and 6 respectively, alternative examples may rely on other types of isolation mechanisms that move product holder 26 into a raised position and thus isolate the load cells from the weight of the chemical product contained therein. In one example, the isolation mechanism may be a solenoid. The solenoid may be connected to door 22*c* or to a portion of dispenser 12 that is fixed with respect to the door and product holder 26. In this example, actuator 52 may be a push button or other switch accessible from outside of housing 22. Activating the switch causes energy to be applied to the solenoid and move the product holder 26 from the lowered to the raised position. The energy applied to the solenoid may then be withdrawn, e.g. by releasing the button or activating the switch a second time, in order to move the product holder 26 from the raised position to the lowered position.

In other examples, the isolation mechanism 14 may be a linkage. For example, a linkage including four or more kinematically connected links may be designed to, when actuated, lift product holder 26 up into the raised position and open door 22*c* in one articulated motion. In some examples, a linkage including six kinematically connected links may be employed to produce a more complex articulated motion, which may be required in some systems to raise the product holder and open the door.

Thus, it shall be understood that the isolation mechanism moves the product holder between the raised and lowered positions may be implemented in a number of ways. For example, the isolation mechanism may be achieved using mechanical, electronic, or a combination of mechanical and electronic implementations, and the invention is not limited in this respect.

Figure 7:
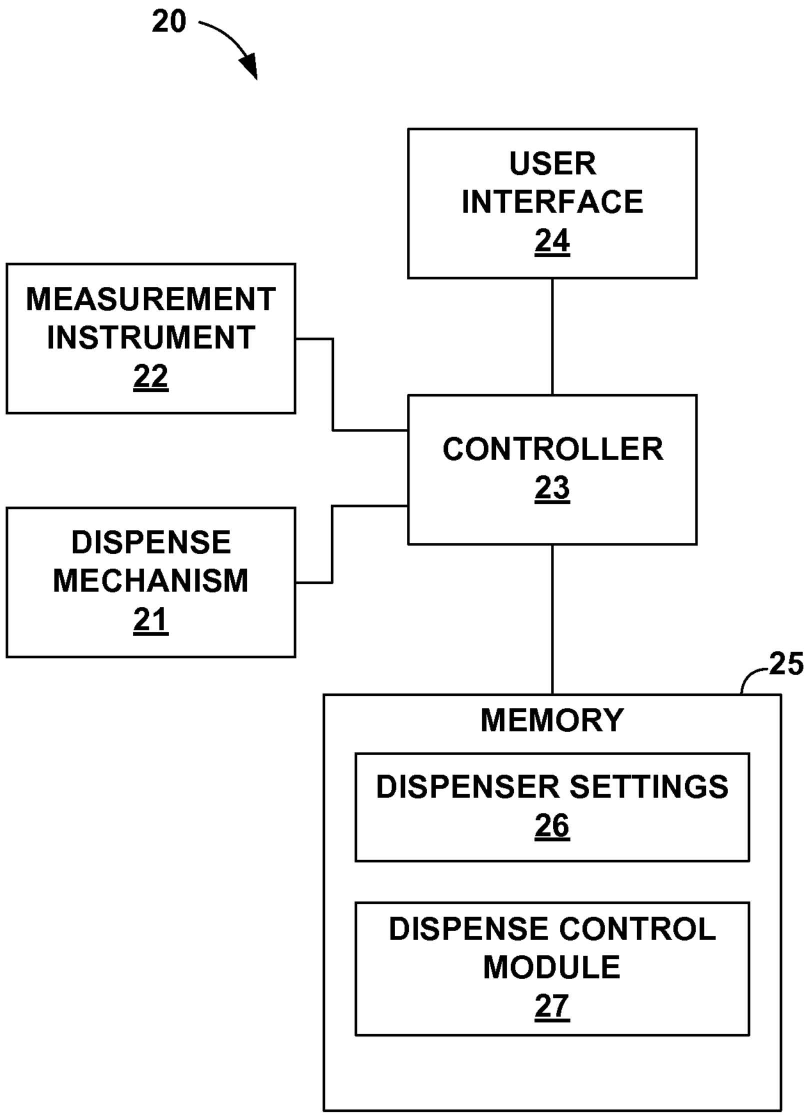
FIG. 7 is schematic illustration of a control system for receiving and processing signals generated by a load cell.

FIG. 7 is a block diagram illustrating the electronic components of an example chemical product dispenser that dispenses a chemical product based on changes in weight of the chemical product remaining in the dispenser. In this generalized example, a dispenser 20 includes a controller 23, a user interface 24 a memory 25, a measurement instrument 22 and a dispense mechanism 21. Controller 23 manages dispensing of chemical product by controlling the dispense mechanism (e.g., an electronically controllable valve that dispenses a fluid chemical product, a dispenser that sprays a solid block of chemical product with a diluent, a pellet dispenser, a flow meter, or some other electronically controllable dispense mechanism) that dispenses the chemical product. Measuring instrument 22 determines the weight of the chemical product remaining in the dispenser 20 at various points in time throughout the product dispense cycle. Memory 25 stores the data and control software that governs operation of the controller 23. For example, memory 25 may include dispenser settings 26 that specify target amounts for one or more chemical product(s) to be dispensed; timing, sequences and amounts of one or more chemical products to be dispensed; or other dispenser settings. Memory 25 may also include a dispense control module 27 that receives the weight of the chemical product from the measuring instrument and that manages dispensing of the chemical product based on the changes in weight of the chemical product remaining in the dispenser.

Figure 8:
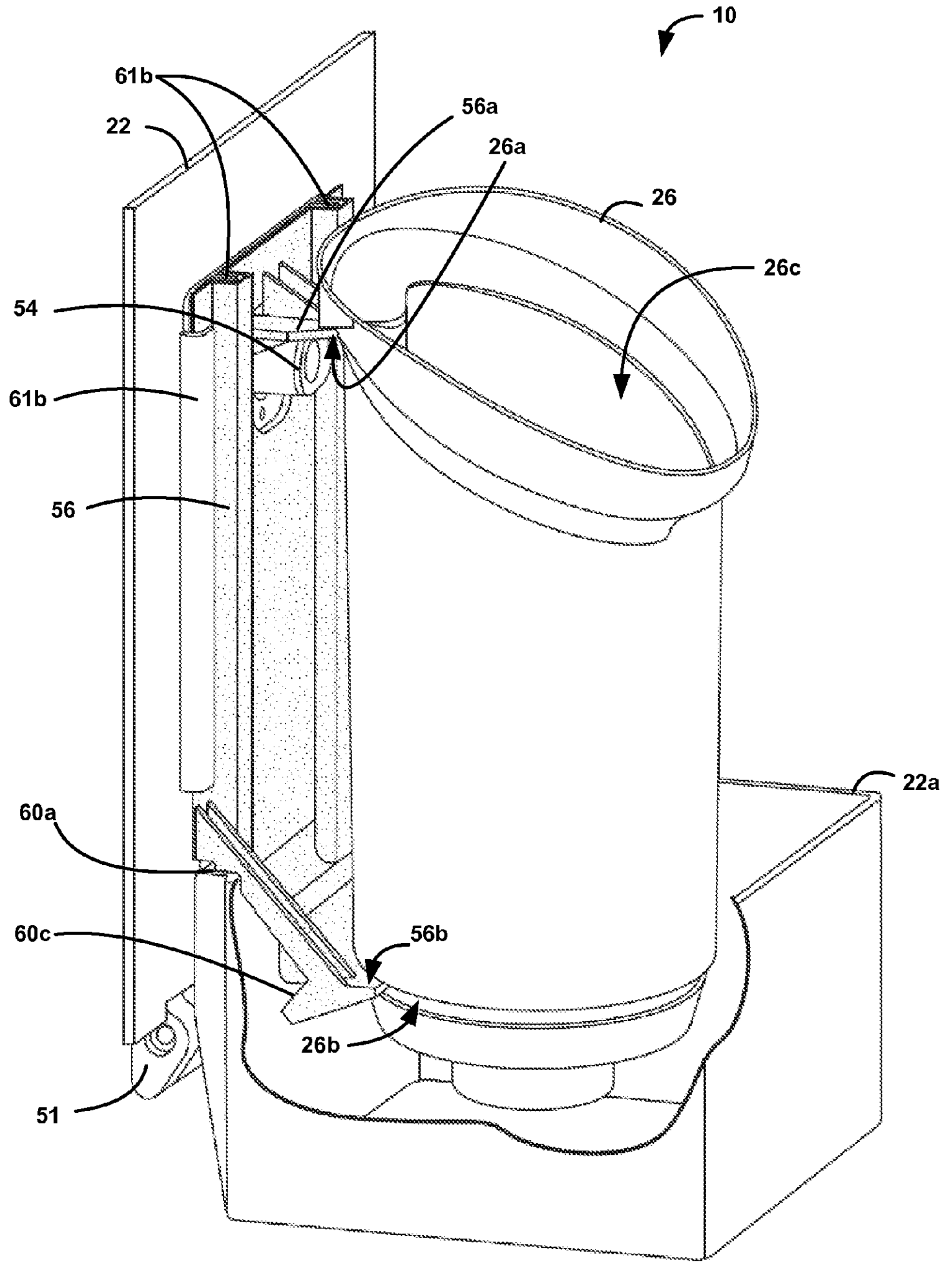
FIG. 8 is a right perspective view of portions of an example dispenser showing an isolation mechanism in a lowered position.

FIG. 8 is a right perspective view of portions of an example dispenser showing an isolation mechanism in a lowered position. As shown above with respect to FIGS. 1-5, in this example, isolation mechanism includes handle 52 (see FIGS. 10 and 11), cam 54 and lift plate 56. Lift plate includes a first flange 56*a* and a second flange 56*b*. In the lowered position shown in FIG. 8, a top side of first flange 56*a* engages lip 26*a* of product holder 26 and a top side second flange 56*b* engages shoulder 26*b* of product holder 26. The handle 52 is in a position such an eccentric portion of cam 54 is not in contact with an under side of first flange 56*a*, and thus lift plate 56 and the product holder 26 are both in their lowered positions.

Figure 9:
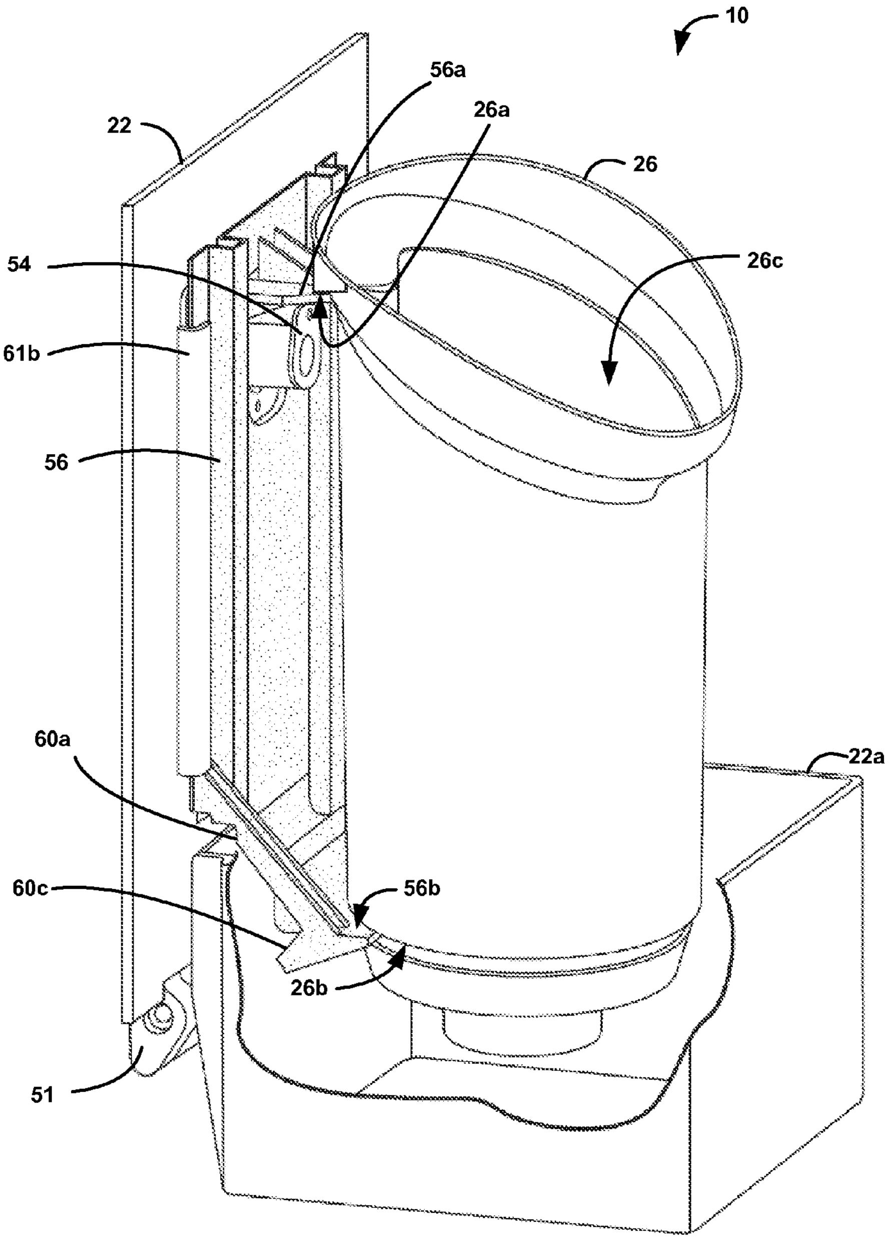
FIG. 9 is a right perspective view of portions of an example dispenser showing an isolation mechanism in a raised position.

FIG. 9 is a right perspective view of portions of the example dispenser of FIG. 8 showing the isolation mechanism in a raised position. Handle 52 has been rotated in a clockwise direction from that shown in FIG. 8 such that eccentric portion of cam 54 contacts the under side of first flange 56*a*. The resulting upward force on the under side of first flange 56*a* causes lift plate 56 to move in an upward direction, thus moving lift plate 56 and product holder 26 from their lowered positions to their raised positions. Rotation of handle 52 thus produces a corresponding rotation of cam 54 that results in a reciprocating (up and down in this example) motion of lift plate 56.

In this example, lift plate 56 moves along slide rails 61*a* and within guides 61*b*. However, it shall be understood that other mechanisms for guiding movement of lift plate 56 may also be used, and that the invention is not limited in this respect.

Figure 10:
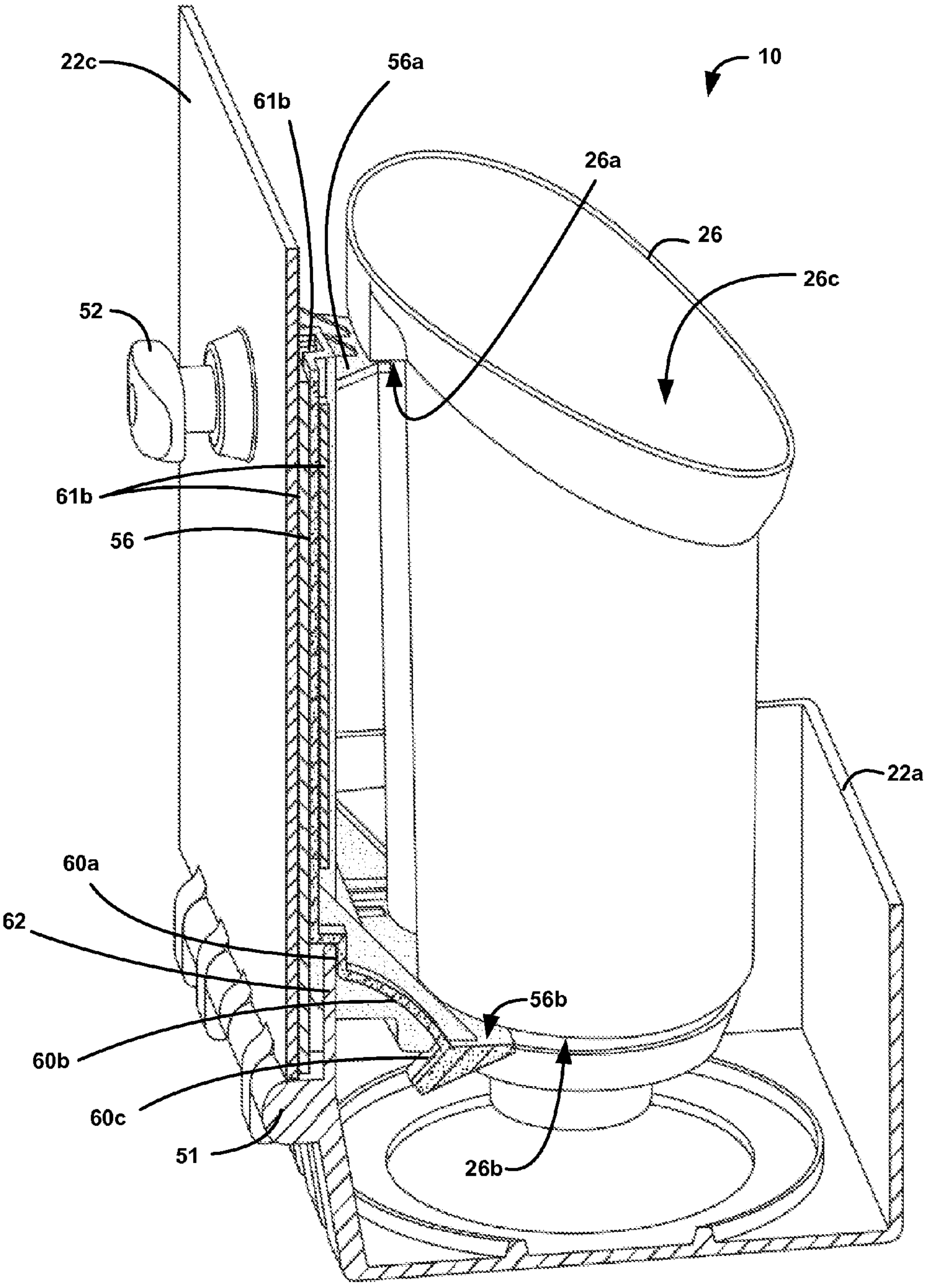
FIG. 10 is a left perspective view of portions of an example dispenser showing an isolation mechanism in a lowered position.

FIG. 10 is a left perspective view of portions of the example dispenser of FIGS. 8 and 9 showing the isolation mechanism in a lowered position. FIG. 10 corresponds to FIG. 8 in that handle 52 is in a position such an eccentric portion of cam 54 is not in contact with an under side of first flange 56*a*, and thus lift plate 56 and the product holder 26 are both in their lowered positions. As can also be seen in FIG. 10, lift plate 56 includes first stop 60*a*, track 60*b* and second stop 60*c*. Housing base 22*a* includes a lock 62. In the lowered position of FIG. 10, first stop 60*a* engages lock 62 and lock 62 thus prevents door 22*c* from being opened. Door 22*c* may thus not be opened when lift plate 56 is in the lowered position.

Figure 11:
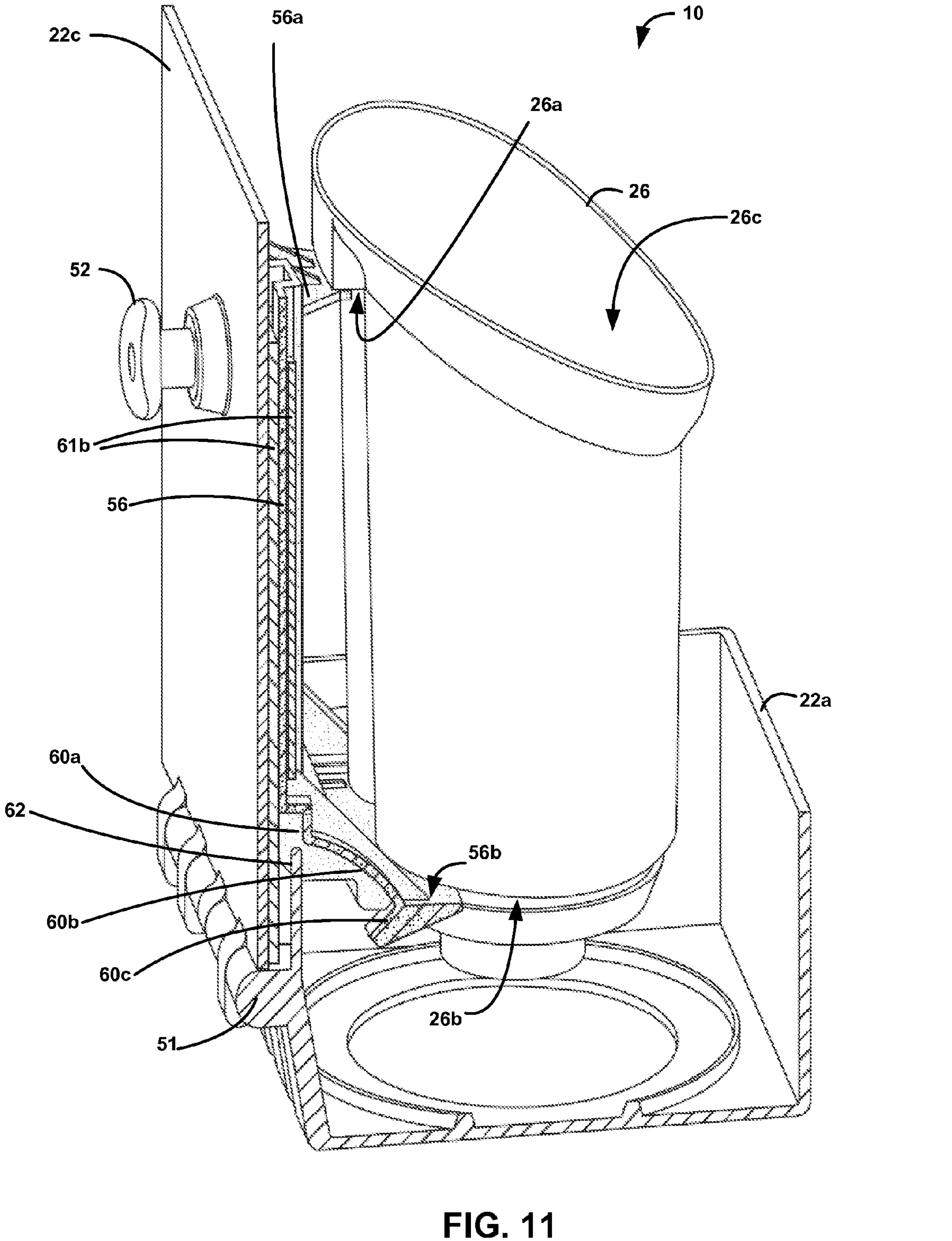
FIG. 11 is a left perspective view of portions of an example dispenser having an isolation mechanism in a raised position.

FIG. 11 is a left perspective view of portions of the example dispenser of FIGS. 8-10 showing the isolation mechanism in a raised position. FIG. 11 corresponds to FIG. 9 in that handle 52 has been rotated in a clockwise direction from that shown in FIG. 10 such that eccentric portion of cam 54 contacts the under side of first flange 56*a*. The resulting upward force on the under side of first flange 56*a* causes lift plate 56 to move in an upward direction, thus moving lift plate 56 and product holder 26 from their lowered positions to their raised positions. By so doing, first stop 60*a* is raised above lock 62 such that first stop 60*a* no longer engages lock 62. Door 22*c* may thus be opened when lift plate 56 is in the raised position.

As door 22*c* is opened, door 22*c* rotates around an axis of rotation defined by hinge 51. Lock 52 follows track 60*b*, guiding the door from the a closed to an open position. When door 22*c* is opened sufficiently, second stop 60*c* engages lock 62, thus preventing door 22*c* from opening any further.

In some examples, the dispenser may also include a damping device. The damping device may operate similar to a slow return drawer closer. The damping device may be configured to operate during lowering of the product holder onto the weight measurement instrument. The damping device may be, for example, a cylinder (air or liquid), or a friction between parts that slows the "dropping" of the product capsule or chemical product to an acceptable level to further protect the weight measurement instrument. The damping device may be used in those circumstances where the "drop" becomes large enough to potentially damage the weight measurement instrument, or in any circumstance where additional protection of the weight measurement instrument is desired.

As discussed above, the chemical product to be dispensed may be contained within a product capsule, or may be loaded directly into the product holder of the chemical product dispenser. The product holder may take the form of a product reservoir, tank, tray, hopper, or other receiver within the dispenser. In some examples, the dispenser need not include a product holder; instead a capsule containing the chemical product may take the place of the product holder described herein. The chemical product may be a solid concentrate; an extruded solid; a pressed solid; a liquid; a gel; a powder; a paste; may take the form of tablets, pellets or other form of unit dose of the chemical product; or may be any other form of chemical product known or will be known to those of skill in the art. In general, the invention is not limited with respect to the form of the chemical product and/or the particular type of dispenser which they are dispensed. Rather, it shall be understood that the invention relates generally to mass or weight-based systems for dispensation of chemical product based on the amount of chemical product remaining in the dispenser, regardless of the form of the chemical product or the particular mechanism by which the chemical product is dispensed. Thus, for example, solid products (whether extruded, pressed, or other form of solid product) may be dispensed via erosion with a diluent, chipping, blocking or cutting; liquids or gels may be dispensed via pumping or via gravity from a chemical product container or, if loaded directly into the dispenser, from a reservoir within the dispenser; pastes may be dispensed from a squeeze tube; tablets or pellets may be dispensed via a mechanical mechanism for releasing tablets or pellets; powders may be dispensed from a product capsule or from a reservoir within a product container, etc. Any of these such chemical products/dispensers may incorporate mass or weight-based dispensing, and the isolation mechanism described herein may thus be incorporated into any of such chemical product dispensing systems.

In addition, although an example mass or weight based dispensing system utilizing load cells and strain gauges as the measuring instrument that determines the mass or weight of the chemical product is described above, it shall be understood that other implementations may also be used, and that the invention is not limited in this respect. For example, the measuring instrument (shown in general as measurement instrument 22 in FIG. 7) that determines the mass or weight of the chemical product used in a particular system implementation may depend in part upon one or more of the following: the dispenser type, the dispenser configuration, the type of chemical product being dispensed, and/or the type of container or capsule (if any) from which the chemical product is to be dispensed. Thus, it shall be understood that the mass or weight of the chemical product may be determined using any appropriate measuring instrument for determining mass or weight, such as analog scales, digital or electronic scales, platform scales, hanging scales, spring scales, balance scales, hydraulic scales, other mechanisms for measuring displacement of a beam (such as optical sensors, capacitive sensor, linear displacement sensor, etc.), and others.

In addition to the applications and benefits of weight based dispensing systems generally, examples disclosed herein have several advantages. The foregoing examples reduce the risk of impact forces on the load cells or other weight measurement instrument(s) during loading of the dispenser in mass-based dispensing systems, which in turn reduces the likelihood that the instrument(s) will be damaged or destroyed during product reloads. The disclosed examples include an isolation mechanism that moves a product holder containing a chemical product (or other type of product) to be dispensed between a lowered and a raised position. In the raised position, the weight of the product holder and the chemical product/capsule is fully supported by the isolation mechanism rather than by the load cells. In the lowered position, the weight of the product holder and the chemical product/capsule is fully supported by the load cells. The isolation mechanism may also control access to the product holder via a latch connected to a door that, when opened, provides access to the product holder and product contained therein. In the disclosed examples, therefore, to load dispenser 12 with a supply of chemical product a door must be unlocked. Unlocking the door also actuates a kinematic isolation mechanism that moves the product holder into the raised position. Once the chemical product is loaded into the dispenser, the door may be closed and relocked. Relocking the door triggers the isolation mechanism to move product holder 26 (and thus the chemical product) into the lowered position in a way that limits impact forces on the load cell.

Certain of the techniques described in this disclosure, including functions performed by a controller, control unit, or control system, may be implemented within one or more of a general purpose microprocessor, digital signal processor (DSP), application specific integrated circuit (ASIC), field programmable gate array (FPGA), programmable logic devices (PLDs), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, firmware. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors or controllers.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of mass-based dispensing applications and devices. In some aspects, for example, such components may form part of a mass dispenser, or be coupled functionally to such a mass dispenser.

If implemented in part by software, the techniques may be realized at least in part by a computer-readable data storage medium comprising code with instructions that, when executed by one or more processors or controllers, performs one or more of the methods described in this disclosure. The computer-readable storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

Various examples have been described. These and other examples are within the scope of the invention defined by the following claims.

The invention claimed is:

1. A dispenser that controls dispensation of a chemical product based on a change in weight of the chemical product remaining in the dispenser, comprising:

a weight measurement instrument that generates one or more electrical signals indicative of the weight of the chemical product remaining in the dispenser;

a product holder configured to receive the chemical product; and an isolation mechanism configured to lift the product holder from a lowered position to a raised position, the isolation mechanism comprising:

an actuator;

a cam operatively connected to the actuator; and a lift plate configured to engage with the cam and configured to engage with the product holder, wherein rotation of the actuator produces a corresponding rotation of the cam such that an eccentric portion of the cam engages the lift plate and moves the lift plate and the product holder from the lowered position in which the weight of the chemical product is fully supported by the weight measurement instrument to the raised position in which the weight of the chemical product is fully supported by the lift plate.

2. The dispenser of claim 1, further comprising:

a door; and a lock, wherein raising of the lift plate from the lowered position to the raised position unlocks the door.

3. The dispenser of claim 2, the lift plate including a first stop that engages the lock when the lift plate is in the lowered position and the door is in a closed position.

4. The dispenser of claim 3, the lift plate further including a second stop that engages the lock when the lift plate is in the raised position and when the door is in an open position.

5. The dispenser of claim 2 wherein the actuator is positioned outside of the door and the cam, the lift plate and the product holder are positioned inside of the door.

6. The dispenser of claim 2 wherein the isolation mechanism is attached to the door.

7. The dispenser of claim 1, wherein the actuator comprises a handle.

8. A dispenser that controls dispensation of a chemical product based on a change in weight of the chemical product remaining in the dispenser, comprising:

a housing having a door pivotally movable between a closed position and an open position;

a weight measurement instrument that generates one or more electrical signals indicative of the weight of the chemical product remaining in the dispenser;

a product holder positioned inside of the housing and configured to receive the chemical product; and an isolation mechanism mounted on the door of the housing and configured to move the product holder between a lowered position in which the weight of the chemical product is fully supported by the weight measurement instrument when the door is in the closed position and a raised position in which the weight of the chemical product is fully supported by the isolation mechanism.

9. The dispenser of claim 8 wherein the isolation mechanism comprises:

an actuator; and a displacement member operatively connected to the actuator and positioned to engage the product holder, wherein actuation of the actuator produces a corresponding movement of the isolation mechanism that moves the product holder between the lowered position and the raised position.

10. The dispenser of claim 9, wherein the actuator is configured to actuate the isolation mechanism by being at least one of rotating, pulling, or pushing.

11. The dispenser of claim 9, wherein the isolation mechanism comprises a gear train.

12. The dispenser of claim 11, wherein the gear train is configured to translate rotation of the actuator into linear displacement.

13. The dispenser of claim 11, wherein the gear train comprises a rack and a pinion.

14. The dispenser of claim 8, wherein the isolation mechanism comprises:

an actuator;

a cam operatively connected to the actuator; and a lift plate configured to engage with the cam and to engage with the product holder, wherein rotation of the actuator produces a corresponding rotation of the cam such that an eccentric portion of the cam engages the lift plate, moving the lift plate and the product holder from the lowered position in which the weight of the chemical product is fully supported by the weight measurement instrument to the raised position in which the weight of the chemical product is fully supported by the lift plate.

15. The dispenser of claim 14, wherein the cam comprises an eccentric disc configured to engage a lever connected to the lift plate.

16. The dispenser of claim 15, wherein the lever comprises a flange protruding from the lift plate.

17. The dispenser of claim 8, wherein the isolation mechanism comprises a linkage.

18. The dispenser of claim 8, wherein the isolation mechanism comprises a solenoid.

19. The dispenser of claim 18, wherein the actuator comprises a button electrically connected to the solenoid.

20. A dispensing apparatus that controls dispensation of a chemical product based on a change in weight of the chemical product remaining in the dispensing apparatus, the dispensing apparatus comprising:

a weight measurement instrument that senses the weight of the chemical product remaining in the dispenser;

a product holder configured to receive the chemical product;

an actuator;

a cam operatively connected to the actuator; and a lift plate configured to engage with the cam and to engage with the product holder, wherein rotation of the actuator produces a corresponding rotation of the cam such that an eccentric portion of the cam engages the lift plate, moving the lift plate and the product holder from a lowered position in which the weight of the chemical product is fully supported by the weight measurement instrument to a raised position in which the weight of the chemical product is fully supported by the lift plate and in which the weight measurement instrument is physically isolated from the weight of the chemical product.

21. The apparatus of claim 20 further comprising at least one slide rail, wherein the lift plate is configured to slidably move along the at least one slide rail when moving between the lowered and raised positions.

* * * * *